(12) United States Patent
Yamakado et al.

(10) Patent No.: US 8,122,347 B2
(45) Date of Patent: *Feb. 21, 2012

(54) DOCUMENT EDITING SUPPORT DEVICE, PROGRAM, AND STORAGE MEDIUM

(75) Inventors: Hitoshi Yamakado, Hino (JP); Yu Gu, Fuchu (JP); Atsushi Nagahara, Chino (JP)

(73) Assignee: Seiko Epson Corporation (JP)

(*) Notice: Subject to any disclaimer, the term of this patent is extended or adjusted under 35 U.S.C. 154(b) by 1198 days.

This patent is subject to a terminal disclaimer.

(21) Appl. No.: 11/825,095

(22) Filed: Jul. 3, 2007

(65) Prior Publication Data

US 2008/0024501 A1    Jan. 31, 2008

Related U.S. Application Data

(60) Provisional application No. 60/821,180, filed on Aug. 2, 2006.

(30) Foreign Application Priority Data

Jul. 4, 2006  (JP) ................................. 2006-184672
Apr. 23, 2007 (JP) ................................. 2007-112907

(51) Int. Cl.
*G06F 17/00* (2006.01)

(52) U.S. Cl. ...................................................... 715/255

(58) Field of Classification Search .................. 715/246, 715/255, 227, 228, 243, 200
See application file for complete search history.

(56) References Cited

U.S. PATENT DOCUMENTS 5,490,246 A * 2/1996 Brotsky et al. ................ 715/763
5,710,896 A * 1/1998 Seidl .............................. 715/744
6,268,851 B1 * 7/2001 Bricklin et al. ............... 715/744
6,575,756 B2 * 6/2003 Sabin ............................ 434/208

(Continued)

FOREIGN PATENT DOCUMENTS

JP          64-017156          1/1989

(Continued)

OTHER PUBLICATIONS

Henshaw, An Algorithm for Projecting Points onto a Patched CAD Model, Google 2002, pp. 265-273.*

(Continued)

*Primary Examiner* — Cong-Lac Huynh
(74) *Attorney, Agent, or Firm* — Harness, Dickey & Pierce, P.L.C.

(57) ABSTRACT

A document editing support device includes: an object obtaining unit that obtains at least one object as data representing at least one of a text and an image included in a document as a target to be edited; a split ratio storage unit that stores a predetermined split ratio; a reference line setting unit that extracts two lines from at least one of a circumscribed polygon and a boundary and sets the extracted lines as reference lines, the circumscribed polygon being of an object other than a target object, a location of which is to be determined relative to at least one object obtained by the object obtaining unit, and the boundary being of a layout area where objects are to be located in the document; a virtual line generation unit that generates a virtual line that splits an interval between the two reference lines set by the reference line setting unit, at a split ratio stored in the split ratio storage unit; and a location unit that determines a location of the target object, the location of which is to be determined, along the virtual line generated by the virtual line generation unit, within the layout area.

21 Claims, 14 Drawing Sheets

U.S. PATENT DOCUMENTS

| | | | |
|---|---|---|---|
| 6,919,890 B2 * | 7/2005 | Halstead, Jr. | 345/440 |
| 6,993,709 B1 | 1/2006 | Lynn et al. | |
| 7,389,473 B1 * | 6/2008 | Sawicki et al. | 715/255 |
| 2001/0040997 A1 * | 11/2001 | Tsap et al. | 382/154 |
| 2002/0042153 A1 * | 4/2002 | Holcman et al. | 438/14 |
| 2003/0229856 A1 | 12/2003 | Lynn et al. | |
| 2004/0030997 A1 * | 2/2004 | Farrah | 715/530 |
| 2004/0070626 A1 | 4/2004 | Matsumoto | |
| 2004/0239691 A1 | 12/2004 | Sprang et al. | |
| 2004/0239693 A1 | 12/2004 | Mullen et al. | |
| 2005/0091599 A1 | 4/2005 | Yamakado et al. | |
| 2005/0149865 A1 * | 7/2005 | Wang et al. | 715/530 |
| 2005/0183009 A1 * | 8/2005 | Hannebauer et al. | 715/517 |
| 2005/0237321 A1 | 10/2005 | Young et al. | |
| 2006/0026508 A1 * | 2/2006 | Balinsky et al. | 715/517 |
| 2006/0026514 A1 * | 2/2006 | Iwakiri | 715/530 |
| 2006/0080597 A1 * | 4/2006 | Shima | 715/509 |
| 2006/0112330 A1 | 5/2006 | Iwasaki | |
| 2006/0120564 A1 * | 6/2006 | Imagawa et al. | 382/103 |
| 2006/0174568 A1 | 8/2006 | Kinoshita et al. | |
| 2006/0204054 A1 * | 9/2006 | Steinberg et al. | 382/118 |
| 2006/0212824 A1 * | 9/2006 | Edenbrandt | 715/788 |
| 2006/0259872 A1 * | 11/2006 | Mullen et al. | 715/764 |
| 2006/0291718 A1 | 12/2006 | Shimizu | |
| 2007/0083811 A1 * | 4/2007 | Matsuo et al. | 715/530 |
| 2007/0130502 A1 * | 6/2007 | Tolgu et al. | 715/503 |
| 2007/0162844 A1 * | 7/2007 | Woodall et al. | 715/517 |
| 2008/0024501 A1 | 1/2008 | Yamakado et al. | |
| 2008/0024502 A1 | 1/2008 | Nagahara et al. | |
| 2008/0195939 A1 * | 8/2008 | Yamakado | 715/255 |

FOREIGN PATENT DOCUMENTS

| | | |
|---|---|---|
| JP | 03-269678 | 12/1991 |
| JP | 07-105212 | 4/1995 |
| JP | 07-234868 | 9/1995 |
| JP | 08-180037 | 7/1996 |
| JP | 08-194832 | 7/1996 |
| JP | 09-270020 | 10/1997 |
| JP | 10-289262 | 10/1998 |
| JP | 10-301980 | 11/1998 |
| JP | 2000-200354 | 7/2000 |
| JP | 2002-142092 | 5/2002 |
| JP | 2002-251624 | 9/2002 |
| JP | 2003-101749 | 4/2003 |
| JP | 2003-523014 | 7/2003 |
| JP | 2005-217802 | 8/2005 |
| JP | 2005-222311 | 8/2005 |
| JP | 2006-024183 | 1/2006 |
| JP | 2006-189989 | 7/2006 |
| JP | 2008-033892 | 2/2008 |
| JP | 2008-035475 | 2/2008 |
| JP | 2008-065587 | 3/2008 |
| JP | 2008-140158 | 6/2008 |
| JP | 2008-141496 | 6/2008 |
| JP | 2008-186332 | 8/2008 |
| JP | 2008-191746 | 8/2008 |
| JP | 2008-197835 | 8/2008 |
| JP | 2008-197990 | 8/2008 |
| JP | 2008-198011 | 8/2008 |
| JP | 2008-204173 | 9/2008 |
| JP | 2008-204179 | 9/2008 |

OTHER PUBLICATIONS

Ch'ng et al., Screen Design: a Dynamic Symmetry Grid Based Approach, Google 2003, pp. 125-135.*

Harriss et al. One-dimensional Substitution Tilings with an Interval Projection Structure, Google 2008, pp. 1-35.*

Levine et al., Quasicrystals. I. Definition and Structure, Google 1986, pp. 1-23.*

Ching et al, Screen design: a dynamic symmetry grid based approach, Google 2003, pp. 125-135.*

Feiner et al., An Experimental System for Creating and Presenting Interactive Graphical Documents, ACM 1982, pp. 59-77.*

Motohide Yoshikawa, "Design Page Spaces with Specific Methodology", DTP World, pp. 114-118 (1999).

"Golden Section Cropping Helper Overlay-An Interesting Little App.(ATRISE)", Sitaraman, M. et al., Internet Citation, Mar. 1, 2004.

"Simulation of a Design Environment for Users to Incorporate Proportioning Systems Into Screen Design", Ch'ng, E., Jan. 2002.

Koji Mashiko, "Secret in Taking Picture Which No One Has Ever Taught Will Be Clarified. Composition of Video Picture", Video Salon, Genkosha, Jan. 1, 2005, vol. 49, No. 1, pp. 120-129.

Przybyl, R.: "Photoshiop Scripts-Golden Ratio Grid"; Jul. 17, 2006; www.adobe.com/cfusion/exchange/index.cfm; All Pages; XP002494661.

U.S. Office Action mailed Mar. 16, 2011, U.S. Appl. No. 11/998,567, pp. 1-18.

* cited by examiner

DOCUMENT EDITING SUPPORT DEVICE, PROGRAM, AND STORAGE MEDIUM

The entire disclosures of Japanese Patent Applications No. 2006-184672 filed on Jul. 4, 2006 and No. 2007-112907 filed on Apr. 23, 2007 are expressly incorporated by reference herein.

BACKGROUND

1. Technical Field

The present invention relates to a technique for generating a grid line.

2. Related Art

A technique for editing or creating a document by using a computer device to arrange objects (digital content sets) within an area is well known. As guide lines for laying out objects, so-called grid lines are used widely (see JP-A-8-194832, JP-T-2003-523014, JP-A-64-17156, JP-A-3-269678, and JP-A-9-270020, for example).

JP-A-8-194832 discloses a technique that does not use uniform grid lines over an entirety of an area but changes the size of grid lines in an arbitrary area. JP-T-2003-523014 discloses a technique for generating grid lines in accordance with parameters such as numbers of characters, font types, and font sizes, used as grid lines for character assemblies on a type page. JP-A-64-17156 discloses a system which allows users to select desired grid lines among plural types of grid lines. JP-A-3-269678 discloses a system which sets up desired grid lines. JP-A-9-270020 discloses a technique for arranging blocks along grid lines.

The technique described in JP-T-2003-523014 requires that users input parameters before generating grid lines. According to each of the other ones of the foregoing publications, grid lines are set up in accordance with instructions or selections which are input by users. As a result, adjusted grid lines differ depending on a level of knowledge and experience of a user.

SUMMARY

The present invention provides a technique for automatically generating grid lines independently of a level of knowledge and experience of a user.

According to one aspect of the invention, there is provided a document editing support device including: an object obtaining unit that obtains at least one object, as data representing at least one of a text and an image included in a document, as a target to be edited; a split ratio storage unit that stores a predetermined split ratio; a reference line setting unit that extracts two lines from at least one of a circumscribed polygon and a boundary, and sets the extracted lines as reference lines, the circumscribed polygon being of an object other than the target object, a location of which is to be determined relative to at least one object obtained by the object obtaining unit, and the boundary being of a layout area where objects are to be located in the document; a virtual line generation unit that generates a virtual line which splits an interval between the two reference lines set by the reference line setting unit, at a split ratio stored in the split ratio storage unit; and a location unit that determines a location of the object is to be determined, along the virtual line generated by the virtual line generation unit, within the layout area.

By the document editing support device configured as described above, virtual lines is automatically generated on the basis of a target document to be edited.

Alternatively in the document editing support device, the split ratio may be within a range of $$\sqrt{2} \le r \le 2 \text{ or } \frac{1}{2} \le r \le \frac{1}{\sqrt{2}}$$

where r is the split ratio. Further, the split ratio may be within a range of $$\left(0.9 \times \frac{1+\sqrt{2}}{2}\right) \le r \le$$

$$\left(1.1 \times \frac{1+\sqrt{5}}{2}\right) \text{ or } \left(0.9 \times \frac{2}{1+\sqrt{5}}\right) \le r \le \left(1.1 \times \frac{2}{1+\sqrt{5}}\right).$$

Alternatively, the split ratio may be $$r = \frac{1+\sqrt{5}}{2} \text{ or } r = \frac{2}{1+\sqrt{5}}.$$

By the document editing support device configured as described above, a virtual line splits an interval between two reference lines at a split ratio within a range including a golden ratio.

Also alternatively in the document editing support device, at least one of the two reference lines may be extracted from a circumscribed rectangle of the object other than the target object.

By the document editing support device configured as described above, a virtual line is generated based on an object included in a document.

Also alternatively in the document editing support device, the reference line setting unit may extract two lines from at least one of the circumscribed polygon of the object other than the target object, the boundary of the layout area, and virtual lines which have already been generated by the virtual line generation unit, and may set the extracted lines as the reference lines.

By the document editing support device configured as described above, virtual lines which have already been generated are used as reference lines.

Also alternatively, the document editing support device further includes a correspondence information storage unit that stores information indicative of correspondence between an object and a virtual line which is generated using as a reference line a line extracted from a circumscribed polygon of the object.

By the document editing support device configured as described above, correspondence between objects and reference lines is stored.

Also alternatively, the document editing support device may further include: an editing unit that changes a size or a position of an object included in the document, and which is used to edit the object; and an update unit that updates a virtual line by use of a reference line, after an object is edited by the editing unit, the virtual line being defined as corresponding to the included object by the information stored in the correspondence information storage unit, and the reference line being extracted from a circumscribed polygon of the object edited by the editing unit.

By the document editing support device configured as described above, virtual lines are updated depending on edits made to objects.

Also alternatively, the document editing support device may further include a correspondence information storage unit that stores information indicative of a correspondence between the boundary of the layout area and a virtual line, which is generated using as a reference line a line extracted from the boundary.

By the document editing support device configured as described above, correspondence between objects and virtual lines is stored.

Further alternatively, the document editing support device may further include: an editing unit that changes a size or position of the layout area in the document, to edit the layout area; and an update unit that updates a virtual line by use of a reference line, after the layout area is edited by the editing unit, the virtual line being defined as corresponding to the layout area by the information stored in the correspondence information storage unit, and the reference line being extracted from the boundary of the layout area edited by the editing unit.

By the document editing support device configured as described above, virtual lines are updated depending on edits made to a layout area.

Further alternatively in the document editing support device, the correspondence information storage unit may further store information indicative of correspondence between a virtual line generated by a reference virtual line generation unit and an object located along the virtual line, and after a virtual line is updated by the update unit, an object which is defined as having been located along the virtual line according to the information stored in the correspondence information storage unit is relocated along the updated virtual line.

By the document editing support device configured as described above, objects are relocated along updated virtual lines Alternatively in the document editing support device, the split ratio storage unit may store a plurality of split ratios, the object as the target whose location is to be determined may include attribute information indicating an attribute of the object, the document editing support device may further include a split ratio selection unit that selects one split ratio from the plurality of split ratios stored in the split ratio storage unit, on the basis of the attribute information included in the target object, a location of which is to be determined, and the virtual line generation unit may generate a virtual line which splits the interval between the two reference lines set by the reference line setting unit, at the split ratio selected by the split ratio selection unit.

By the document editing support device configured as described above, a split ratio is used, selected from a plurality of split ratios on the basis of an attribute of an object.

Also alternatively in the document editing support device, the split ratio storage unit may store a plurality of split ratios, the document may include layout information indicative of a location of the at least one object included in the document, the document editing support device may further include a split ratio selection unit that selects one split ratio from the plurality of split ratios stored in the split ratio storage unit, on the basis of the layout information included in the document, and the virtual line generation unit may generate a virtual line which splits the interval between the two reference lines set by the reference line setting unit, at the split ratio selected by the split ratio selection unit.

By the document editing support device configured as described above, a split ratio is used, selected from a plurality of split ratios on the basis of a layout.

Also alternatively in the document editing support device, the split ratio storage unit may store a plurality of split ratios, the document may include background information indicative of a background, the document editing support device may further include a split ratio selection unit that selects one split ratio from the plurality of split ratios stored in the split ratio storage unit, on the basis of the background information included in the document, and the virtual line generation unit may generate a virtual line which splits the interval between the two reference lines set by the reference line setting unit, at the split ratio selected by the split ratio selection unit.

By the document editing support device configured as described above, a split ratio is used, selected from a plurality of split ratios on the basis of a background.

Also alternatively, the document editing support device may further include a display controller that causes a display to show a figure overlapped on the virtual line.

By the document editing support device configured as described above, a figure overlapping a virtual line is displayed.

According to another aspect of the invention, there is provided a program causing a computer device having a split ratio storage unit storing a predetermined split ratio to execute: obtaining at least one object as data representing at least one of a text and an image included in a document as a target to be edited; extracting two lines from at least one of a circumscribed polygon and a boundary, and setting the extracted lines as reference lines, the circumscribed polygon being of an object other than a target object, a location of which is to be determined relative to the obtained at least one object, and the boundary being of a layout area where objects are to be located in the document; generating a virtual line which splits an interval between the two reference lines set, at a split ratio stored in the split ratio storage unit; and determining a location of the object as the target whose location is to be determined, along the generated virtual line, within the layout area.

According to still another aspect of the invention, there is provided a computer readable storage medium storing the program.

By the program, virtual lines are automatically generated on the basis of a document which is used as a target to be edited.

BRIEF DESCRIPTION OF THE DRAWINGS

The invention will now be described with reference to the accompanying drawings, wherein like numbers denote like elements.

DESCRIPTION OF EXEMPLARY EMBODIMENT

1. Structure

Figure 1:
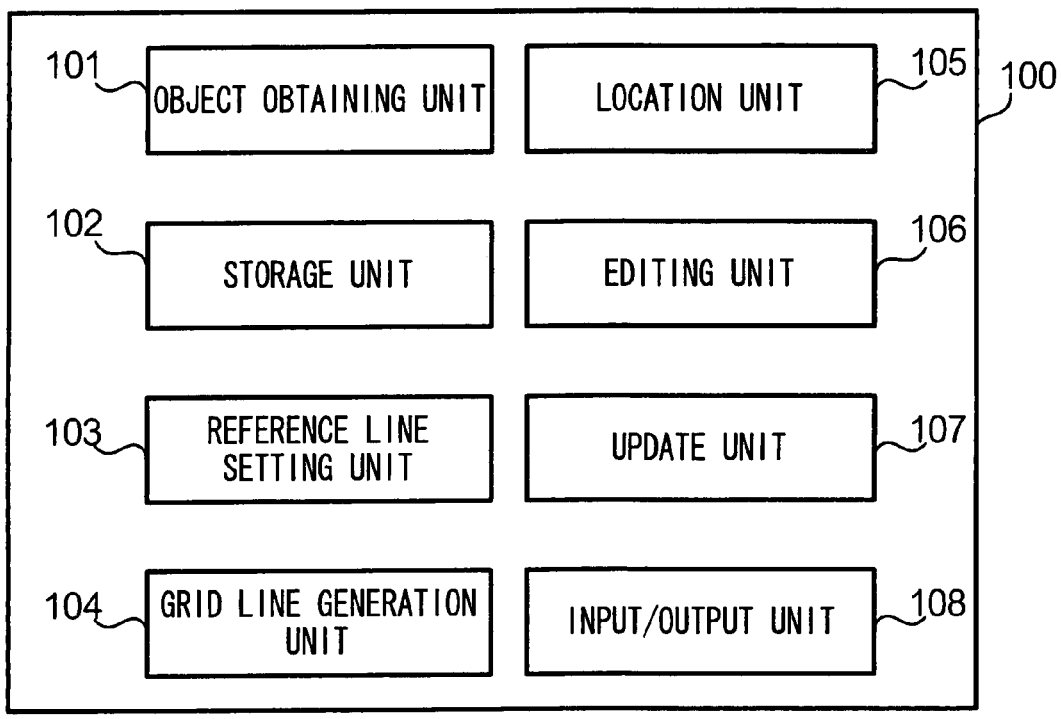
FIG. 1 is a block diagram showing a functional structure of a document editing device 100 according to one embodiment of the invention.

FIG. 1 is a block diagram showing a functional structure of a document editing device 100 according to an exemplary embodiment of the present invention. The document editing device 100 has a function of editing a document, and a function of supporting editing of a document, associated with the former function. The document editing device 100 automatically generates grid lines on the basis of a document as a target to edit (hereinafter an "edit target"). The term "document" refers to a data set which includes at least one object located within a layout area and layout information indicative of the location of the object in the layout area, or refers to an output result which is output in accordance with the data set. The term "object" refers to data indicative of one or both of a text (character string) and an image, or directly to the text or image indicated by the data. The term "layout area" refers to an area where an object is located, e.g., a physical boundary of a document to be output. The layout area is, for example, one or plural paper sheets, one page, sequential plural pages, a partial area in a page, or a type page. The term "grid lines" refers to guide lines used for guiding layout of objects. The grid lines are virtual lines and need not always be displayed to be visible to users.

An object obtaining unit 101 obtains an object as a target, a location of which should be determined. A storage unit 102 stores various data and programs. Specifically, the storage unit 102 stores a predetermined split ratio r. A reference line setting unit 103 extracts two lines from either a circumscribed polygon which touches an object other than the target object among objects included in the target document, or a boundary of a layout area. The reference line setting unit 103 sets the extracted lines as reference lines. A grid line generation unit 104 generates a grid line which splits the interval between the two reference lines at the predetermined ratio. A location unit 105 determines the location of a target object along the grid line. An input/output unit 108 displays and outputs data such as a document or inputs instructions from users.

In addition, the storage unit 102 stores information indicative of correspondence between an object and a virtual line generated based on a reference line. The reference line is extracted from a circumscribed polygon of the object. An editing unit 106 edits an object. Specifically, the editing unit 106 changes the size, position, or other attributes of the object. Each time an object is edited, an update unit 107 updates a virtual line corresponding to the object on the basis of the edited object. Specifically, the update unit 107 regenerates a virtual line by use of a reference line extracted from a circumscribed polygon of the edited object.

Further, the storage unit 102 stores information indicative of correspondence between a virtual line and an object located along the virtual line. Each time a virtual line is updated, a location unit 105 relocates the object, which has been located along the virtual line, newly along the updated virtual line.

In this embodiment, the storage unit 102 stores a golden ratio as a split ratio. The "golden ratio" is defined by the following equation (1). The left and right sides of the equation (1) are replaceable.

$$1 : \frac{1+\sqrt{5}}{2} \tag{1}$$

Figure 2:
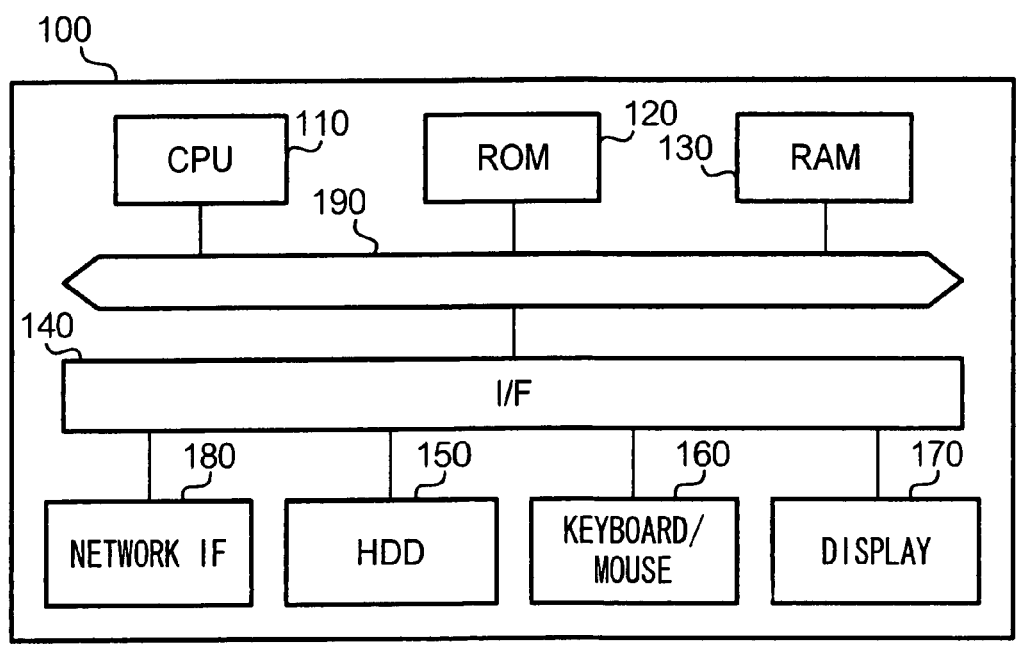
FIG. 2 is a block diagram showing a hardware structure of the document editing device 100.

FIG. 2 is a block diagram showing a hardware structure of the document editing device 100. A CPU (Central Processing Unit) 110 is a control device which controls respective components of the document editing device 100. A ROM 120 is a storage device which stores data and programs necessary for startup of the document editing device 100. A RAM 130 is a storage device which functions as a work area when the CPU 110 executes a program. An I/F (Interface) 140 is an interface through which data and control signals are input/output from/to various input/output devices and storage devices. A HDD (Hard Disk Drive) 150 is a storage device which stores various programs and data. In the present embodiment, the HDD 150 stores a document editing program which generates a grid line, and a golden ratio as a split ratio. A keyboard/mouse 160 is an input device with which a user inputs instructions to the document editing device 100. A display 170 is an output device which displays content of data or states of processing. In this embodiment, the display 170 displays objects, layout areas, and grid lines. A network IF 180 is an interface which transmits/receives data to/from other devices connected through a network (not shown). The document editing device 100 is capable of receiving a document (more exactly, electronic data indicative of a document) through the network and the network IF 180. The CPU 110, ROM 120, RAM 130, and I/F 140 are connected via a bus 190. As the CPU 110 executes a document editing program, the document editing device 100 establishes the functional structure as shown in FIG. 1. The document editing device 100 may be of any type as long as the document editing device 100 of the type includes the functional structure shown in FIG. 1 and the hardware structure shown in FIG. 2. For example, the document editing device 100 may be a personal computer. Alternatively, the document editing device 100 may be an image forming device such as a printer which has functions as described above.

2. Operation 2-1. Generation of Grid Lines

Figure 3:
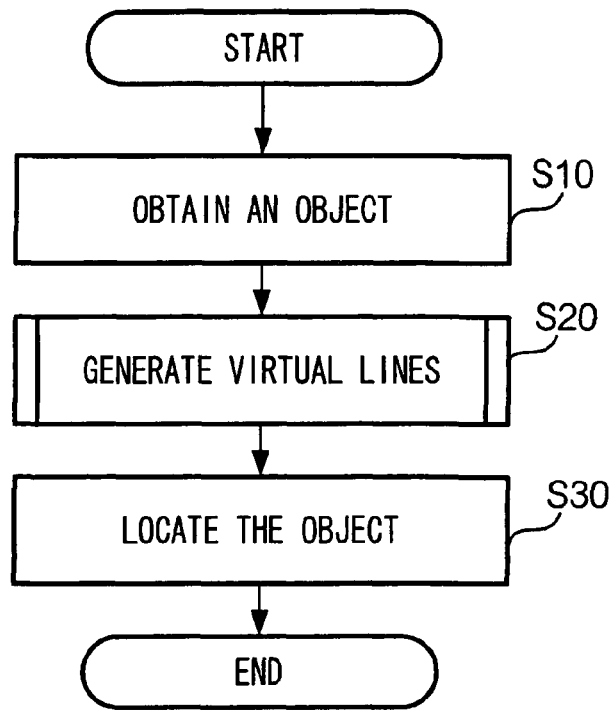
FIG. 3 is a flowchart showing operation of the document editing device 100.

FIG. 3 is a flowchart showing operation of the document editing device 100. In a step S10, the CPU 110 obtains an object as a target to be processed. In this embodiment, the CPU 110 obtains an object included in a document $D_1$ as a target document. The document $D_1$ is stored in the HDD 150. The CPU 110 reads the document $D_1$ from the HDD 150.

Figure 4:
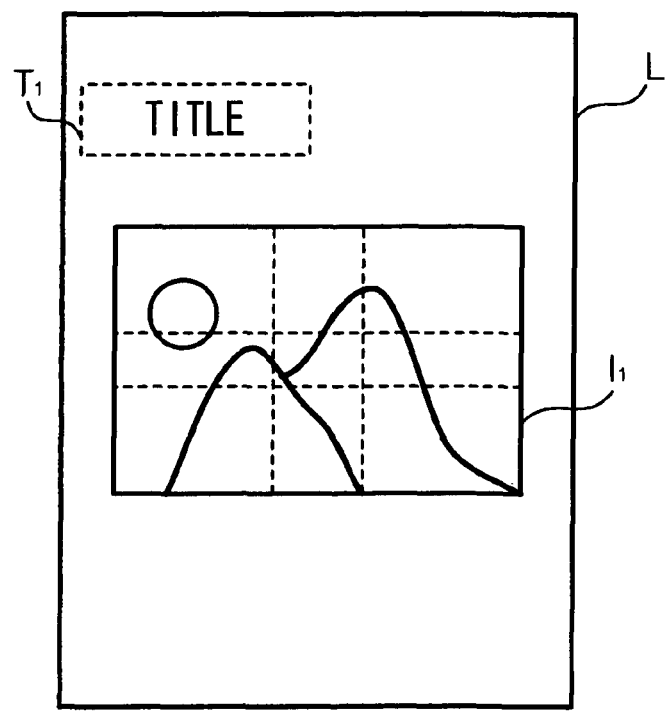
FIG. 4 exemplarily shows a document $D_1$ as a target document.

FIG. 4 exemplarily shows the document $D_1$ as a target document. The document $D_1$ includes objects $T_1$ and $I_1$ in a layout area L. Each of the objects includes attribute information indicative of its own attribute. A target object is specified, for example, based on an instruction from a user. The following description will be directed to an exemplary case of taking the object $I_1$ as a target object.

Referring once more to FIG. 3, the CPU 110 generates a grid line in a step S20. In a step S30, the CPU 110 locates the target object along the generated grid line.

Figure 5:
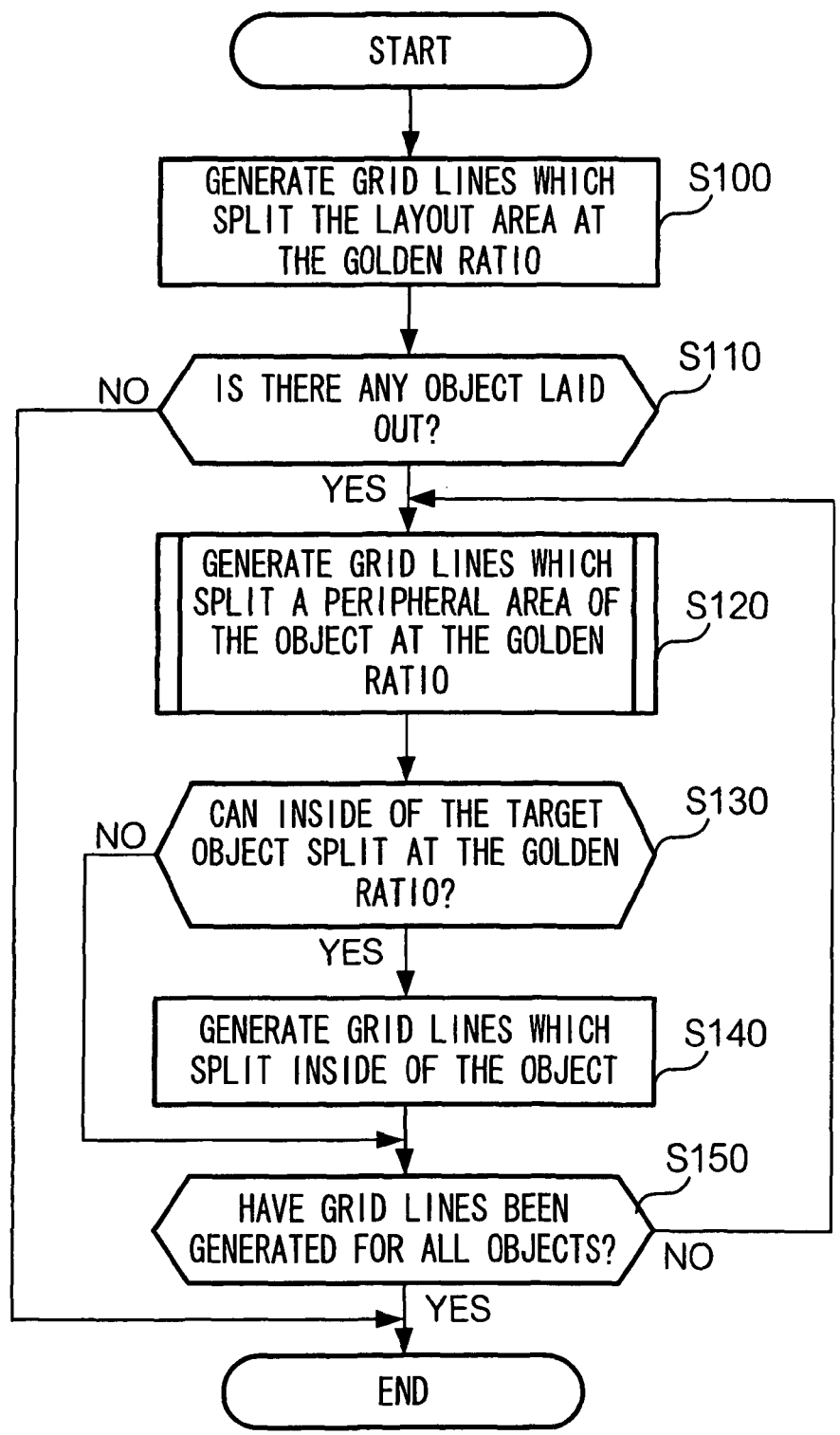
FIG. 5 is a flowchart showing details of grid line generation processing.

FIG. 5 is a flowchart showing details of a grid line generation processing. The flow shown in FIG. 5 is triggered by, for example, input of an instruction from a user about generation of a grid line. In a step S100, the CPU 110 generates a grid line which splits a layout area L at a golden ratio. More specifically, the CPU 110 firstly determines one set of reference lines used for generating a grid line. The reference lines are two lines extracted from one or both of the following items (i) and (ii).

(i) A circumscribed polygon which touches an object other than the target object, among objects included in the target document.

(ii) The boundary of the layout area L

Which of the aforementioned lines should be used is determined in advance. In this case, the boundary of the layout area L is used for reference lines, e.g., two sets of lines, one set consisting upper and lower edges of the boundary of the layout area L and the other set consisting of right and left edges of the boundary.

The CPU 110 generates grid lines which split an interval between selected reference lines at a golden ratio, for each set of selected reference lines. In this example, two grid lines are generated from one set of (two) reference lines. That is, a total of four grid lines are generated from two sets of reference lines. The CPU 110 stores into the RAM 130 information which specifies the generated grid lines, e.g., parameters indicating inclinations and intercepts of lines.

Figure 6:
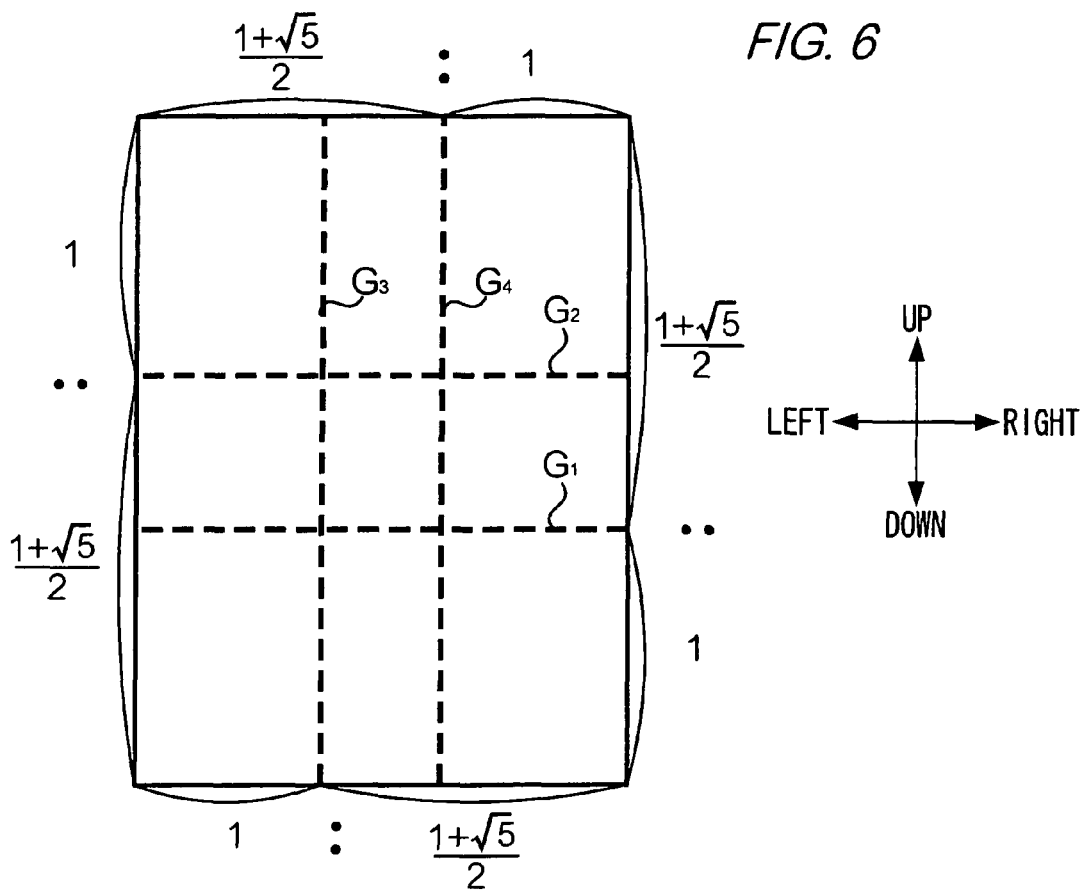
FIG. 6 exemplarily shows generated grid lines.

FIG. 6 exemplarily shows generated grid lines. In FIG. 6, solid lines denote a boundary of a layout area L, and broken lines denote grid lines. Grid lines $G_1$ and $G_2$ are generated based on the upper and lower edges of the layout area L as reference lines. Grid lines $G_3$ and $G_4$ are generated based on the left and right edges of the layout area L as reference lines. The number of generated grid lines is not limited to the example shown in FIG. 6. The CPU 110 may generate grid lines, based on only one set of reference lines, i.e., either the set of upper and lower edges of the boundary of the layout area L or the set of left and right edges of the boundary. In the example shown in FIG. 6, two grid lines are generated for each set of reference lines, so that one of the grid lines splits the interval between two reference lines at $$1 : \frac{1+\sqrt{5}}{2}$$

as well as the other splits the interval at $$1 : \frac{1+\sqrt{5}}{2}$$

However, the CPU 110 may generate only one of the two grid lines.

Referring again to FIG. 5, the CPU 110 determines whether or not an object other than a located object exists in the layout area L, in a step S110. In other words, the CPU 110 determines whether an object other than a target object exist in the layout area L. The document $D_1$ includes area information indicative of a layout area, at least one object, and layout information indicative of the location of the object in the layout area. Based on these items of information, the CPU 110 determines whether or not any other object exists. If it is determined that no other object exists (step S10: NO), the CPU 110 terminates the processing shown in FIG. 5. Now, the document $D_1$ includes an object (object $I_1$) other than a target object (object $T_1$) (step S110: YES), and therefore, the CPU 110 proceeds to the processing to a step S120.

In the step S120, the CPU 110 generates at least one grid line which split a peripheral area of the object other than the target object at a golden ratio. That is, the CPU 110 generates new grid lines by use of reference lines determined on the basis of the other object.

Figure 7:
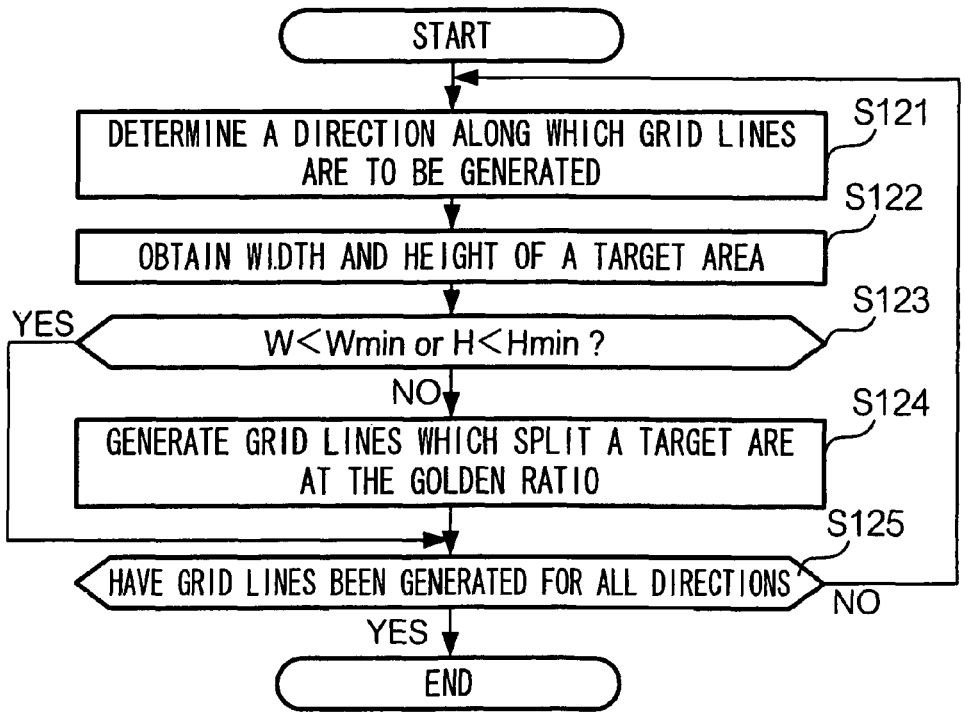
FIG. 7 is a flowchart showing the grid line generation processing for a peripheral area.

FIG. 7 is a flowchart showing a grid line generation processing in a peripheral area of the object other than the target object. In a step S121, the CPU 110 determines with reference to the object other than the target object along which direction the grid lines should be generated. More specifically, the CPU 110 determines a reference line on the basis of the object other than the target object. The reference line is extracted from edges forming a circumscribed rectangle of the object other than the target object. For example, the CPU 110 determines use of any one of upper, lower, left, and right edges of the circumscribed rectangle of the object other than the target object, as a reference line (hereinafter a "first reference line"). In this embodiment, the CPU 110 determines use of the upper edge of the circumscribed rectangle of the object other than the target object, as the first reference line.

In this example, the boundary of the object $I_1$ is equal to the circumscribed rectangle of the object $I_1$. Therefore, an "edge of the circumscribed rectangle of the object" will be simply referred to as an "edge of the object". For example, the "upper edge of the circumscribed rectangle of the object" will be simply referred to as the "upper edge of the object".

Next, the CPU 110 determines another reference line (hereinafter a "second reference line"). More specifically, the CPU 110 determines that a line which satisfies a predetermined condition among reference line candidates should be used as a second reference line. The reference line candidates are, for example, edges of still another object other than the target object existing in the layout area L, edges of a circumscribed rectangle of the still another object, or edges of the boundary of the layout area. A condition for selecting a second reference line requires, for example, a line to "extend in the same direction as the first reference line, relative to the center of gravity of the still another object, and be parallel to the first reference line". In this embodiment, the CPU 110 determines the upper edge of the layout area L as the second reference line. Thus, in this embodiment, grid lines are determined to be generated "above" the still another object (object $I_1$).

In a step S122, the CPU 110 obtains width and height of an area (hereinafter a "target area") where grid lines are to be generated. The term "target area" refers to an area surrounded by lines including at least the first and second reference lines. In this embodiment, the target area is the smallest area among areas surrounded by a line including the first reference line, a line including the second reference line, and the reference line candidates.

Figure 8:
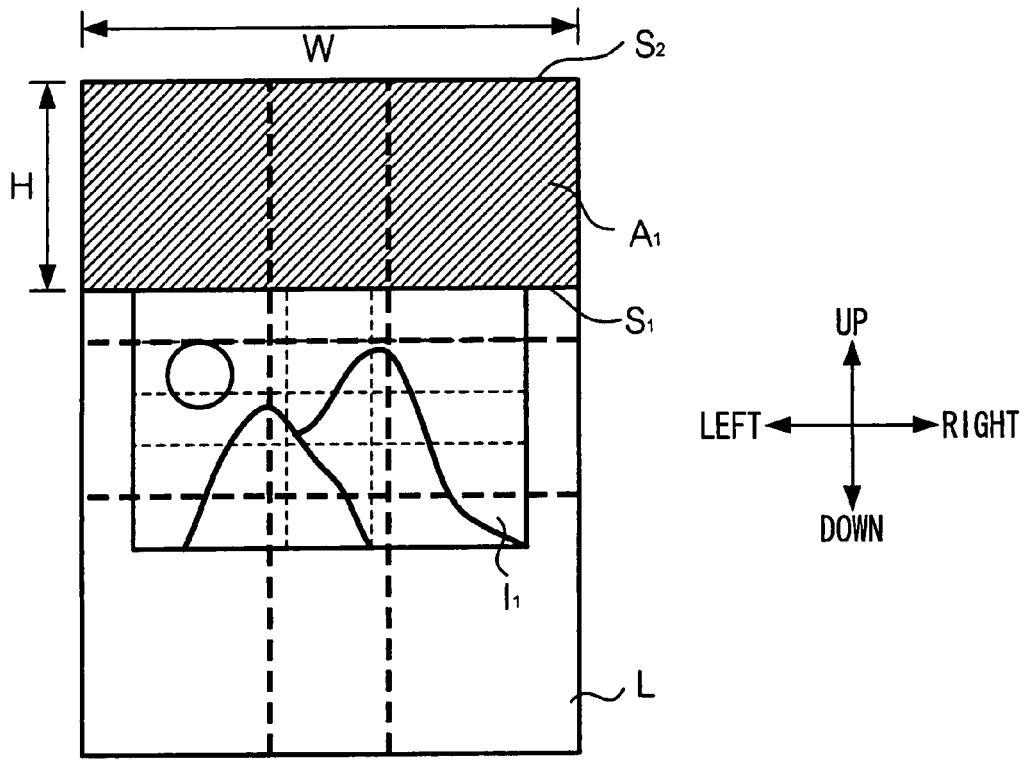
FIG. 8 exemplarily shows a target area.

FIG. 8 exemplarily shows a target area. A first reference line $S_1$ is a line including the upper edge of the object $I_1$. A second reference line $S_2$ is an upper edge of the layout area L. In this embodiment, the target area is surrounded by the first reference line $S_1$, the second reference line $S_2$, and the left and right edges of the layout area L. In FIG. 8, the target area $A_1$ is hatched with oblique lines. The CPU 110 calculates the height H and width W of the target area $A_1$.

Referring again to FIG. 7, the CPU 110 determines whether the height H and width W of the target area and minimum height $H_{min}$ and minimum width $W_{min}$ of the target object satisfy a predetermined condition, in a step S123. The minimum height of an object is the smallest height of the object. The minimum width of an object is the smallest width of the object. An example of the predetermined condition is that one of the height H and width W of the target area should be smaller than corresponding one of the minimum height $H_{min}$ and minimum width $W_{min}$. That is, $W<W_{min}$ or $H<H_{min}$ is used as the predetermined condition. If this condition is determined to be satisfied (S123:YES), the CPU 110 does not generate grid lines which split the target area at the golden ratio but shifts the processing to a step S125.

The condition used in the step S123 is not limited to the condition described above. For example, the condition may be that both the height H and width W of the target area should be respectively smaller than the minimum height $H_{min}$ and minimum width $W_{min}$, i.e., $W<W_{min}$ and $H<H_{min}$. Otherwise, grid lines may be generated for all target areas independently of the height H and width W of the target areas. In this case, there is a possibility that a target object will be located such that it overlaps with an object other than the target object.

If the condition is determined not to be satisfied (S123: NO), the CPU 110 generates a grid line which splits the target area at the golden ratio, i.e., splits the interval between the first and second reference lines at the golden ratio. This processing is carried out in the same manner as in the step S100 in FIG. 5. The CPU 110 stores information, which specifies generated grid lines, in the RAM 130, with the information being related to information which identifies an object based on generation of the grid lines. The information which specifies generated grid lines includes, for example, parameters indicative of inclinations and intercepts of lines, or points included in lines and direction vectors of the lines. The other information identifying the object, on the basis of which the grid lines are generated is, for example, an identifier of the object.

In a step S125, the CPU 110 determines whether or not the processing is complete for all directions. That is, the CPU 110 determines whether the processing is complete for all reference line candidates related to the object other than the target object. In this embodiment, the CPU 110 determines whether or not the processing is complete regarding the upper, lower, right, and left edges each as a first reference line. If it is determined that the processing is not complete for all the directions (step S125: NO), the CPU 110 updates the first reference line and performs the processing of steps S121 to S125 repeatedly. If it is determined that the processing is complete for all the directions (step S126:YES), the CPU 110 terminates the processing shown in FIG. 7.

The CPU 110 stores into the HDD 150 information indicative of correspondence between grid lines and reference lines used for generating the grid lines (hereinafter referred to as "correspondence information of reference lines"). The correspondence information of reference lines includes, for example, an identifier of a grid line, an identifier specifying a figure from which reference lines are extracted (reference lines of a layout area or a circumscribed rectangle of the object other than the target object), and edges of the figure used as reference lines.

Figure 9:
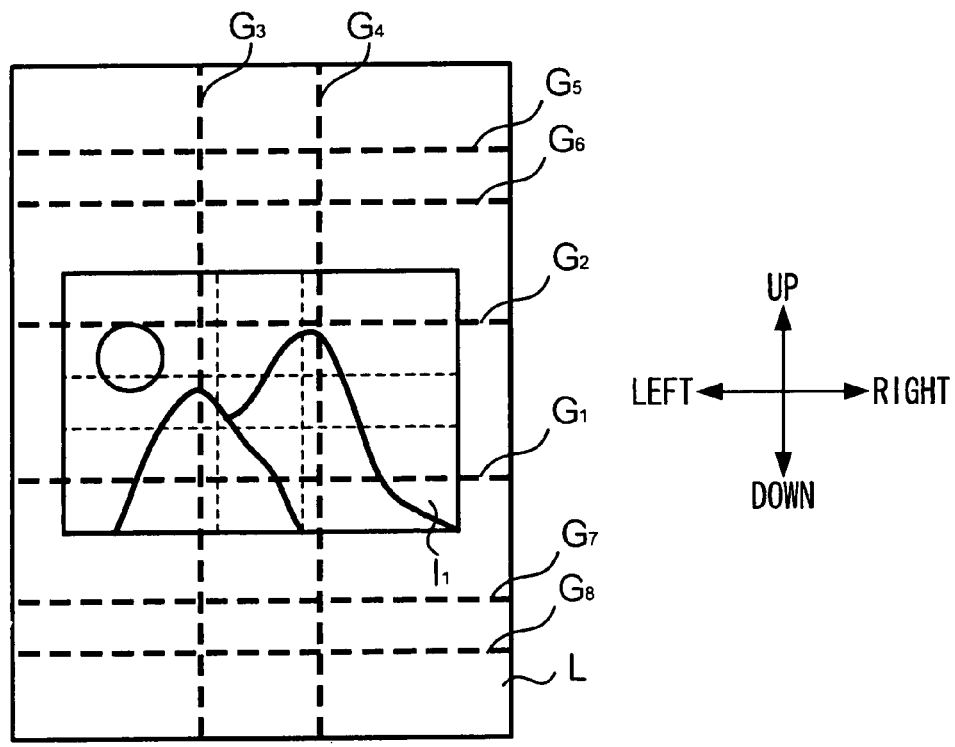
FIG. 9 shows an example of grid lines generated in a peripheral area.

FIG. 9 exemplarily shows grid lines generated in a peripheral area of the object other than the target object (object $I_1$). Grid lines $G_5$ to $G_8$ are generated above and below the object $I_1$. In this example, since areas in the left and right sides of the object $I_1$ have smaller width or height than the minimum width or height of the object $T_1$, grid lines are not generated.

Referring again to FIG. 5, the CPU 110 determines whether or not inside of the target object can be split, in the step S130. This determination is made on the basis of attribute information indicative of an attribute of the object. As an attribute of an object, for example, the type of the object is available (e.g., text or image). More specifically, if the target object represents an image, the CPU 110 determines that the inside of the target object may be split. An attribute other than the type of an object is also available. For example, the attribute may be a flag indicating whether the inside can be split or not. In this case, the CPU 110 determines whether or not inside can be split on the basis of the flag. Alternatively, it is possible to use information indicative of an attribute, size, or position of an object. The attribute information is included in the object. Otherwise, the attribute information may be stored in the form of a database or the like in the HDD 150.

If it is determined that the inside of the target object cannot be split (step S130: NO), the CPU 110 shifts the processing to a step S150. Otherwise, if it is determined that the inside of the target object can be split (step S130: YES), the CPU 110 generates a grid line which splits the inside of the target object at a golden ratio. This processing is carried out in the same manner as the processing of the step S100. In this case, two sets of reference lines are used, i.e., a set of upper and lower edges of the target object, and another set of left and right edges of the target object.

In the step S150, the CPU 110 determines whether or not the processing is complete for all objects other than the target object. If it is determined that the processing is not complete for all objects other than the target object (S150: NO), the CPU 110 updates the target object to be processed, and repeats the processing of the steps S120 to S150. If the processing is determined to be complete for all other objects (S150: YES), the CPU 110 terminates the processing shown in FIG. 5. The CPU 110 displays the generated grid lines on the display 170. The user may specify the position of the object, referring to the grid lines. Otherwise, the CPU 110 may determine a location of the object in accordance with a predetermined algorithm. In this case, the grid lines need not be displayed on the display 170. The CPU 110 outputs a document edited in this manner. That is, the edited document is stored into the HDD 150, displayed on the display 170, or output through an output device such as a printer by the CPU 110.

Figure 10:
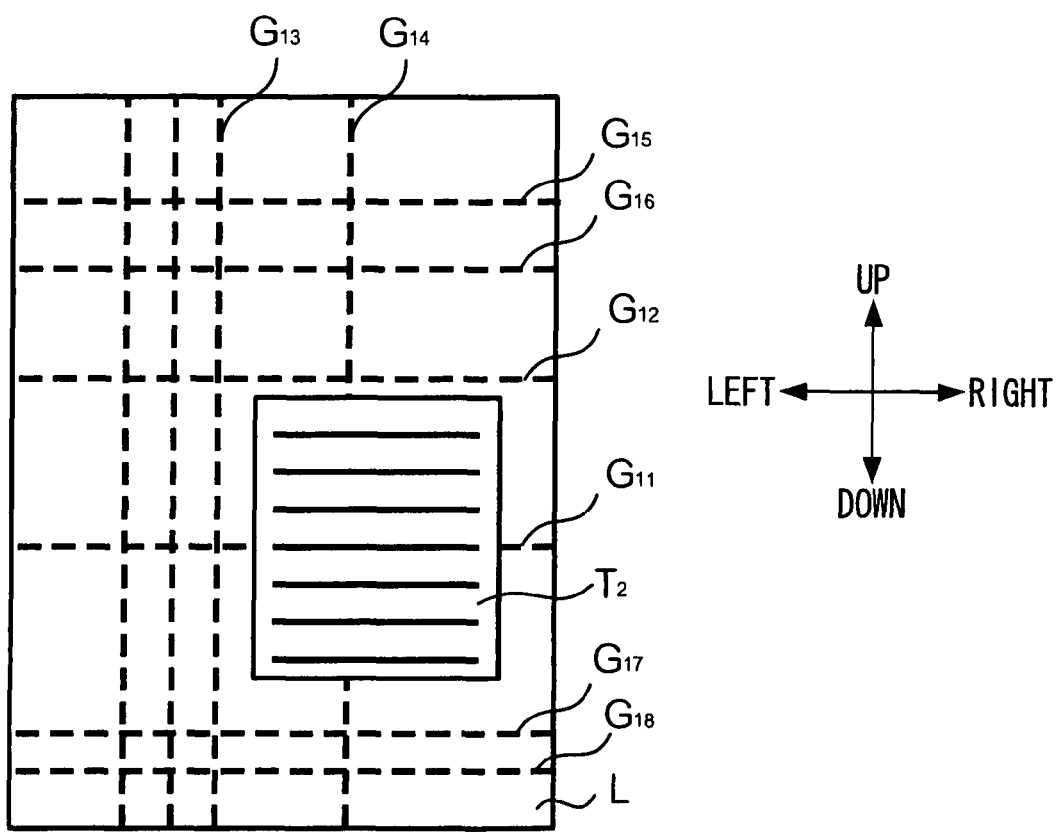
FIG. 10 shows another example of generation of grid lines.

FIG. 10 shows another example of generation of grid lines. In this example, the document includes an object $T_2$, grid lines $G_{11}$ to $G_{14}$ are generated, based on edges of a layout area L as reference lines. Grid lines $G_{15}$ and $G_{16}$ are generated above the object $T_2$. Grid lines $G_{17}$ and $G_{18}$ are generated below the object $T_2$. Two other grid lines are generated in the left side of the object $T_2$.

2-2. Update of Grid Lines

Processing for generating new grid lines has been described above. Next, description will be made of processing for updating generated grid lines, depending on changes to an object or layout area. In this example, the document editing program has a function of changing a position or size of an object or a shape or size of a layout area in response to an operational input entered by a user. That is, the document editing program has a function of editing an object or layout area. In this section 2-2, the term "target object" refers to an object whose position or size is changed.

Figure 11:
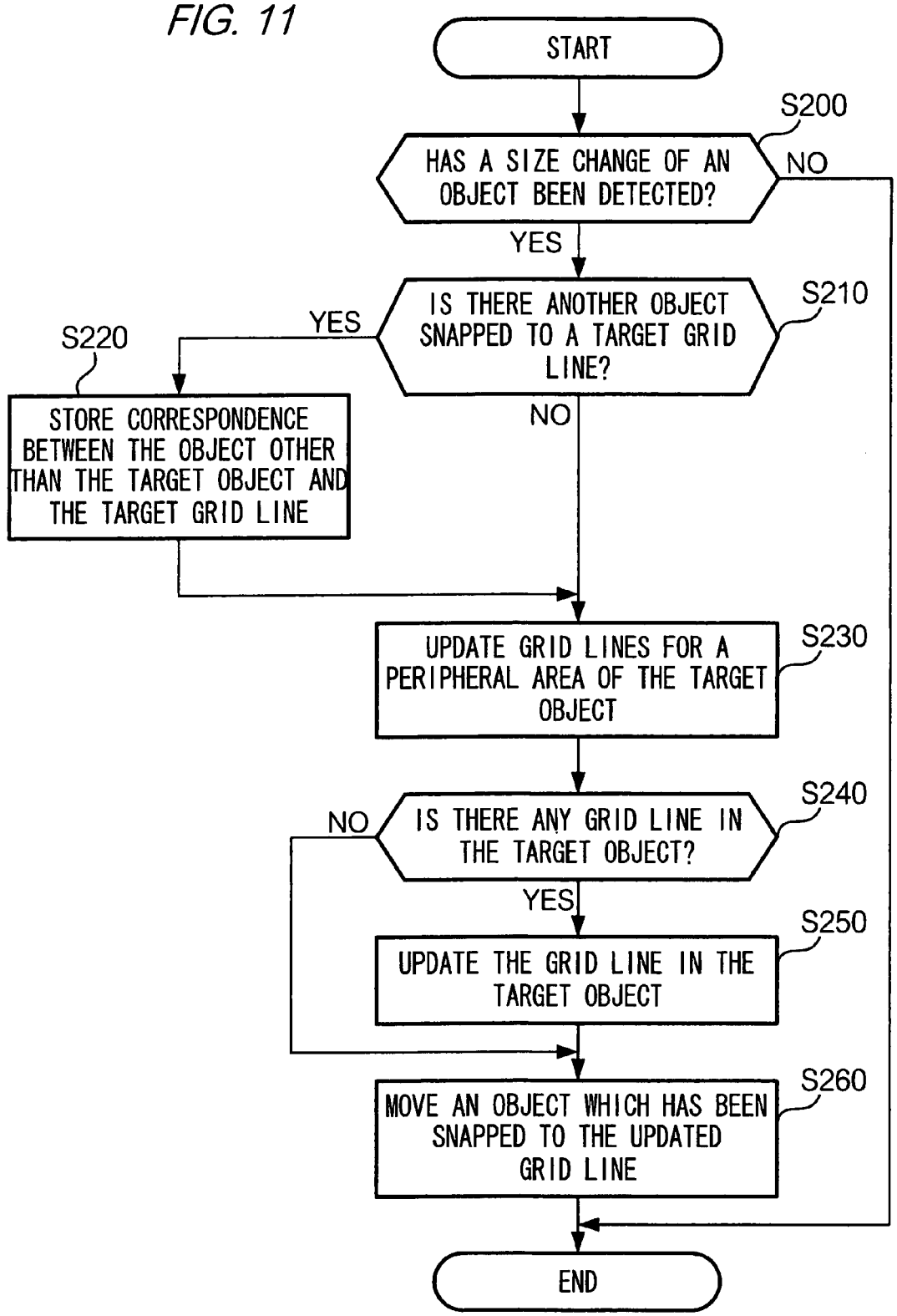
FIG. 11 is a flowchart showing processing for updating grid lines.

FIG. 11 is a flowchart showing processing for updating grid lines. The processing will now be described referring to an example of changing the size of an object. If a change is made to the position of an object, the size of a layout area (e.g., from A4 size to B4 size), or the shape of the layout area (e.g., from a rectangle to a pentagon), processing is carried out in the same manner as described below.

In a step S200, the CPU 110 determines whether or not the size of an object has been changed. If the size of an object is not determined to have been changed (S200: NO), the CPU 110 terminates the processing shown in FIG. 11. Otherwise, if the size of an object is determined to have been changed (S200: YES), the CPU 110 shifts the processing to a step S210.

In the step S210, the CPU 110 determines whether or not there is any object snapped to a target grid line. The term "target grid line" refers to a grid line corresponding to a target object, i.e., any of grid lines which are generated with edges of a circumscribed rectangle of the target object regarded as reference lines. The term "target object" refers to an object as a target to be processed, i.e., the object whose size has been changed. The phrase an "object snapped to a grid line" refers to an object whose position has been determined based on a grid line. There may be a case that no "target grid lines" exist, or a case that plural "target grid lines" exist. For example, if a lower edge of a circumscribed rectangle of an object O is determined to be equal to the grid line $G_1$, it can be said that "the object O is snapped to the grid line $G_1$". Otherwise, if lower and right edges of a circumscribed rectangle of the object O are respectively determined to be equal to the grid lines $G_1$ and $G_3$, it can be said that "the object O is snapped to the grid lines $G_1$ and $G_3$".

If it is determined that there is an object other than the target object snapped to a target grid line (S210: YES), the CPU 110 stores information indicative of correspondence between the target grid line and the object other than the target object (hereinafter referred to as "snap-correspondence information"), in a step S220. The snap-correspondence information includes, for example, an identifier which specifies a grid line and an identifier which specifies an object snapped to the grid line.

In a step S230, the CPU 110 updates grid lines so that a peripheral area of a target object is split at the golden ratio. That is, the CPU 110 generates an updated grid line while storing correspondence between the grid lines and the object before and after the update. The updated grid lines split the peripheral area of the changed target object. Processing for generating the updated grid lines is carried out in the same manner as the processing carried out in step S124 in FIG. 7.

In a step S240, the CPU 110 determines whether or not a grid line exists inside the target object. If a grid line is determined to exist inside the target object (step S240: YES), the CPU 110 updates the grid line inside the target object, in a step S250. That is, the CPU 110 generates updated grid lines while storing correspondence between the grid lines and the target object before and after the update. Processing for generating the updated grid lines is carried out in the same manner as the processing carried out in the step S140 in FIG. 5.

In a step S260, the CPU 110 moves the object, which has been snapped to the grid line updated by the foregoing processing, to a position defined by the updated grid lines. That is, the CPU 110 relocates the object along the updated grid lines.

Figure 12:
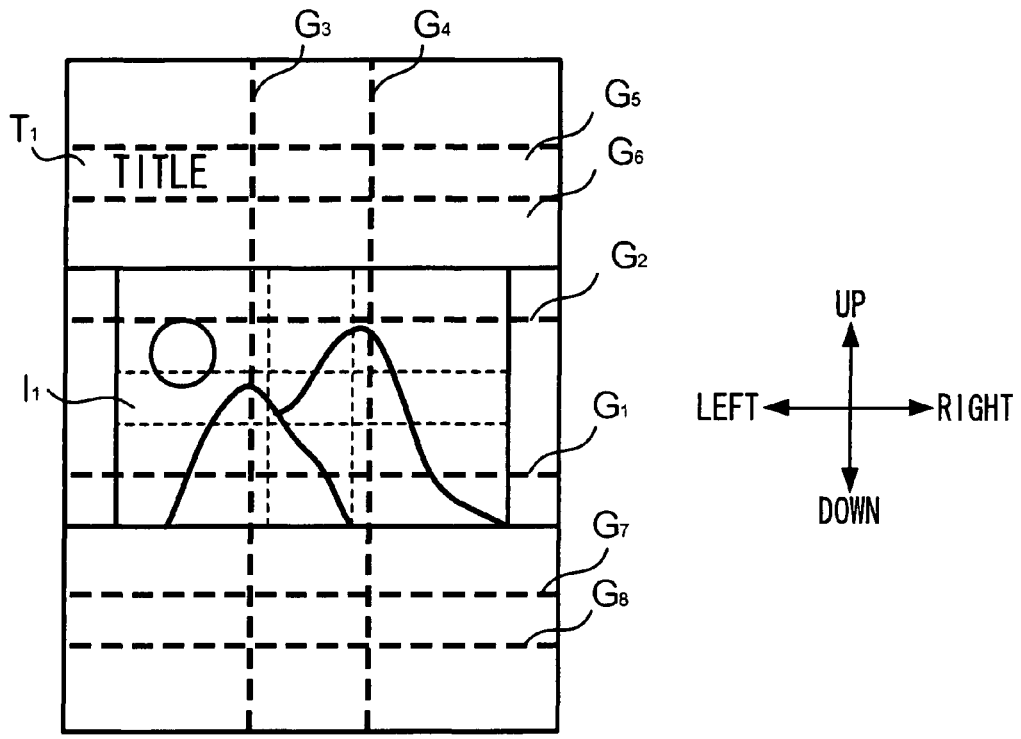
FIG. 12 exemplarily shows grid lines before update.
Figure 13:
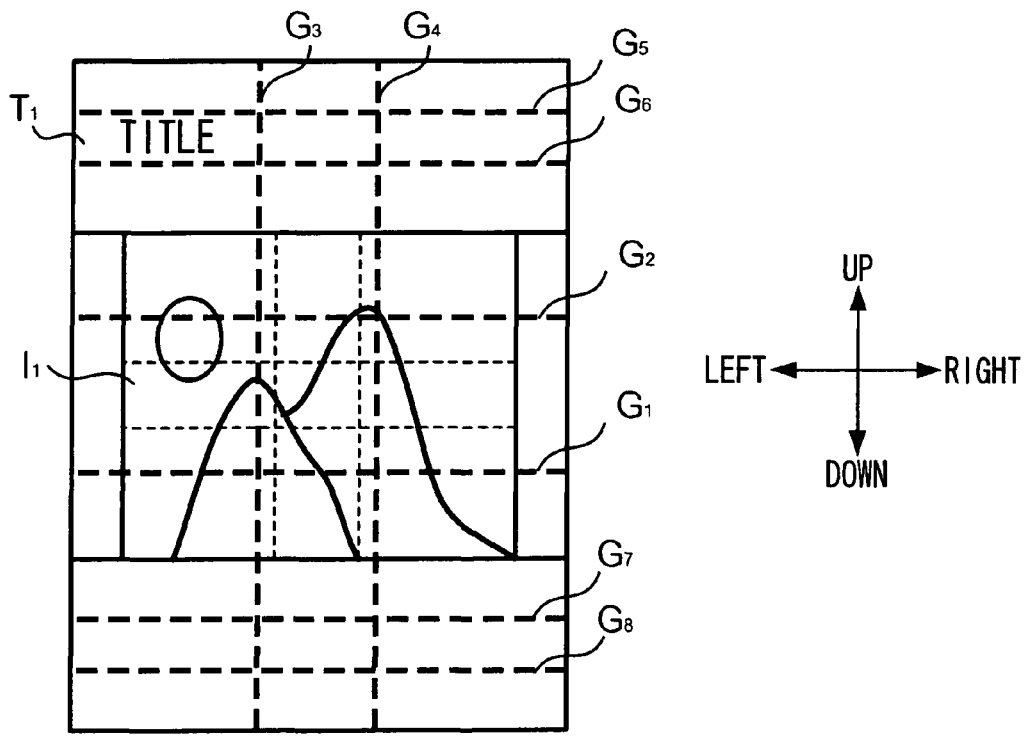
FIG. 13 exemplarily shows grid lines after the size of an object is changed.
Figure 14:
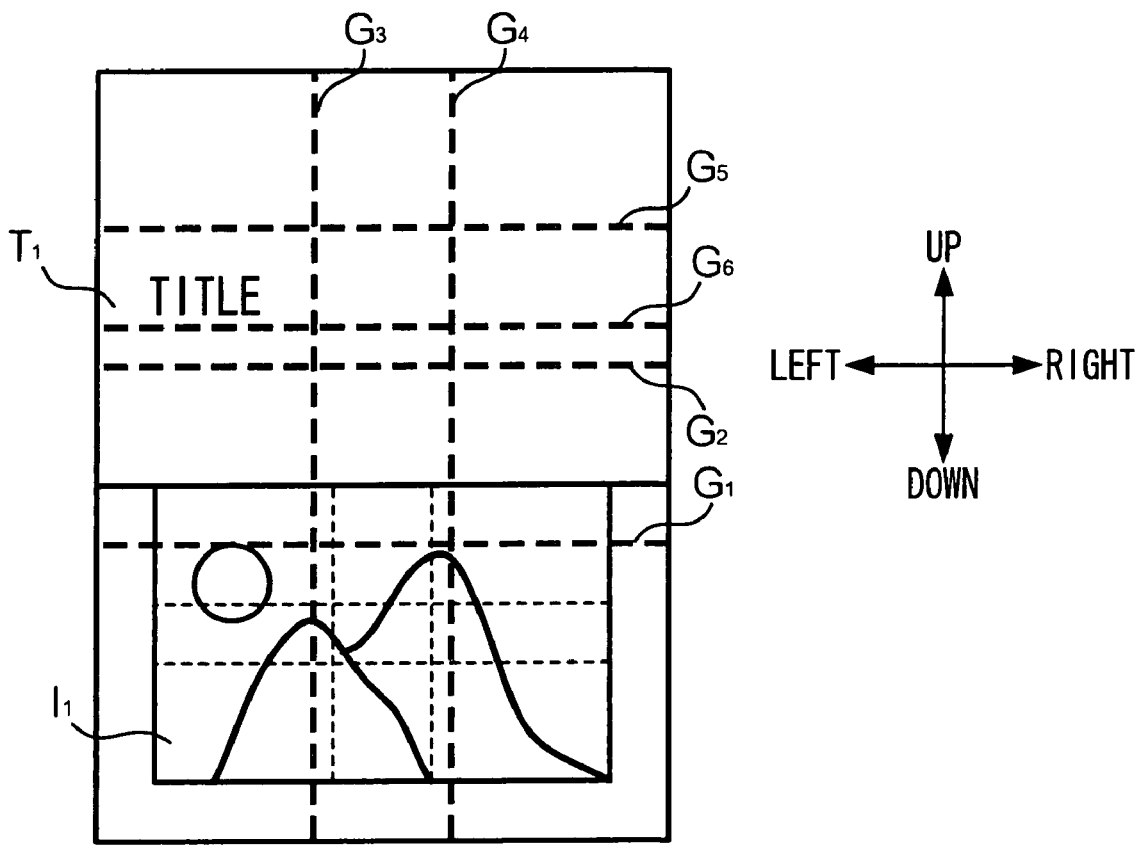
FIG. 14 exemplarily shows grid lines after changing the position of an object is changed.

FIG. 12 exemplarily shows grid lines before update. FIG. 13 exemplarily shows updated grid lines after a size change to the object. FIG. 14 exemplarily shows grid lines after a position change to the object. In these examples, the object $I_1$ is the target object. The position of another object $T_1$ is determined so that the lower edge of the object $T_1$ is equal to the grid line $G_6$, i.e., the lower edge of the object $T_1$ is positioned above the grid line $G_6$. Depending on a size change (FIG. 13) and a position change (FIG. 14) to the object $I_1$, the position of the grid line $G_6$ is changed. In these cases, the position of the object $T_1$ is determined to be along the updated grid line $G_6$.

As has been described above, at least one grid line is automatically generated independently from knowledge and experience of users, according to the present embodiment. In addition, a grid line is dynamically updated depending on locations of objects. Therefore, a grid line is obtained matched with layout of objects.

3. Modifications

The invention is not limited to the exemplary embodiment described above but can be variously modified in practice. From the description below, explanation of features in common with the above embodiment will be omitted. In the description below, components common to those described the above embodiment will be denoted by use of like reference numerals. Two or more of modifications described below may be combined with each other for use.

3-1. Modification 1

The split ratio used for splitting an interval between two reference lines is not limited to the golden ratio. For example, the split ratio r may fall within a range of $$\sqrt{2} \le r \le 2 \text{ or } \frac{1}{2} \le r \le \frac{1}{\sqrt{2}},$$

$$1 : \sqrt{2}$$

is a so-called "silver ratio". The foregoing ranges are considered desirable based on disclosures of "Mathematics seminar", vol. 42, no. 7, p. 32, published in July 2004, NIPPON HYORONSHA CO., LTD. Alternatively, the split ratio r may be defined within a predetermined range relative to the golden ratio as a reference, such as a range of ±10%. The range of ±10% is widely used as a tolerable range for errors. More specifically, the split ratio r may fall within a range expressed by the equations (2) or (3) below.

$$\left(0.9 \times \frac{1+\sqrt{5}}{2}\right) \le r \le \left(1.1 \times \frac{1+\sqrt{5}}{2}\right) \quad (2)$$

$$\left(0.9 \times \frac{2}{1+\sqrt{5}}\right) \le r \le \left(1.1 \times \frac{2}{1+\sqrt{5}}\right) \quad (3)$$

3-2. Modification 2

The HDD 150 may store plural split ratios. In this case, the CPU 110 selects one split ratio to be used for processing, from among the plural split ratios. Selection of the one split ratio is carried out, for example, based on an attribute of a target object. The attribute refers to a characteristic of an object, examples of which are cited below. The attribute may be, for example: (a) an object type (text, image, or the like); (b) an object category ("title", "subtitle", "body", "main image", "sub image", or the like); (c) a font size; (d) a font type ("mincho", "gothic", or the like); (e) a font style ("standard", "bold", "italic", or the like); (f) an object size (area, the number of characters, the number of pixels, or the like); (g) an object priority ("high", "medium", "low", an index, or the like); (h) content of an image ("human", "landscape", "mountain", "flower", or the like); (i) an object shape ("triangle", "rectangle", "pentagon", "star", "ellipse", or the like); (j) an object color (average color, representative color, or the like); or (k) a relationship between an object and a grid line (e.g., whether an object is located above or below a grid line, or the like). Next there will be described specific examples in which split ratios are selected depending on attributes of objects.

Example of Selecting a Split Ratio Depending on the Shape of a Target Object

Figure 15A:
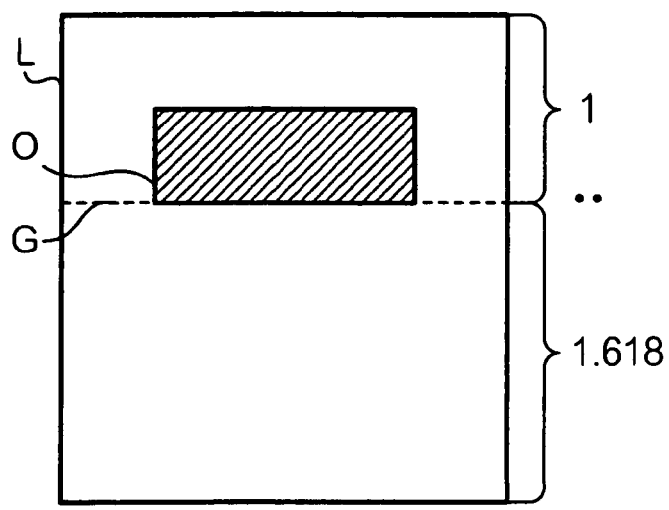
FIGS. 15A, 15B, and 15C exemplarily show a method for selecting a split ratio according to Modification 2.
Figure 15B:
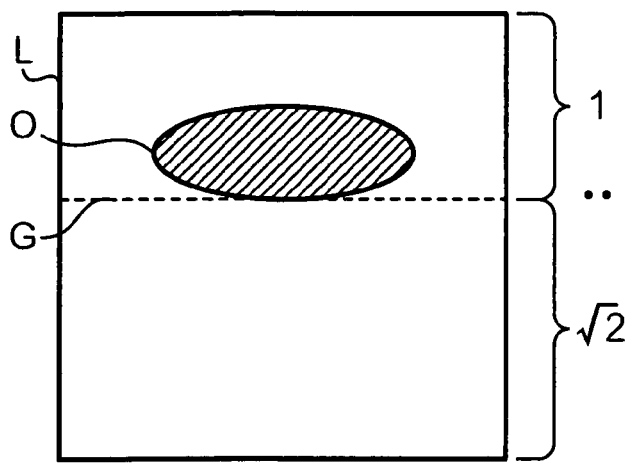
Figure 15C:
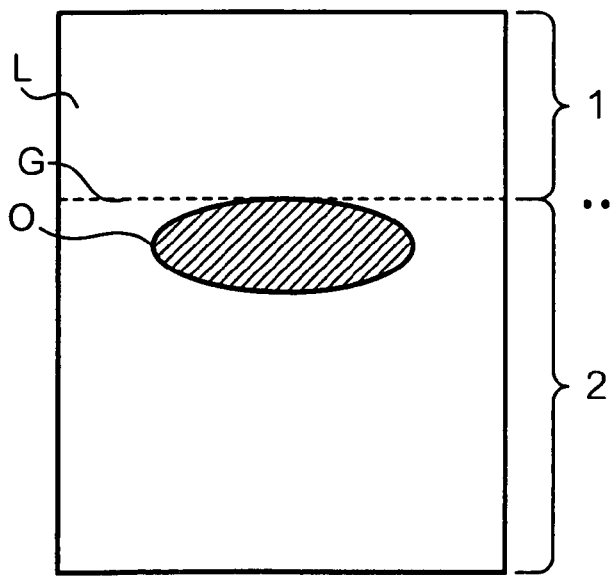

FIGS. 15A through 15C exemplarily show a method for selecting a split ratio according to Modification 2. In this example, the HDD 150 stores three split ratios of $r_1=\sqrt{2}$, $r_2=1.618$ (golden ratio), and $r_3=2.0$. The HDD 150 also stores a table which holds correspondence between object attributes and split ratios. This table describes that: if the shape of an object is a "rectangle", the split ratio $r_2$ is used (FIG. 15A); if the shape of an object is not a "rectangle" and if the object is located on a virtual line, the split ratio $r_1$ is used (FIG. 15B); and if the shape of an object is not a "rectangle" and the object is located below a virtual line, the split ratio $r_3$ is used (FIG. 15C). The CPU 110 selects a split ratio in accordance with this table.

If an object O is a rectangle, an edge of the object O overlaps a grid line G. In this case, the boundary of the object can be visually recognized clearly, and therefore, the golden ratio is adopted as a split ratio. If the object O is a circle, ellipse, start, or any other shape than a rectangle, no edge of the object O overlaps the grid line G. In this case, the boundary of the object is considered to be visually closer to the center than the boundary. Therefore, if the object is located above a virtual line, $r_1=\sqrt{2}$ is adopted as a split ratio. If the object is located below the virtual line, $r_3=2.0$ is adopted as a split ratio. In the latter cases, information indicating whether the object O is located above or below the grid line G is included in the attribute information.

Figure 16A:
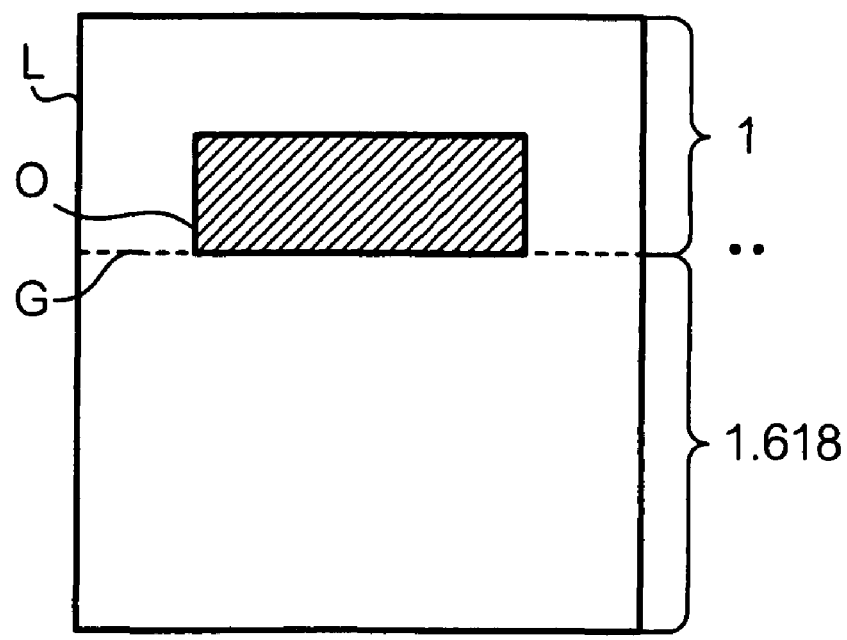
FIGS. 16A and 16B exemplarily show another method for selecting a split ratio according to Modification 2.
Figure 16B:
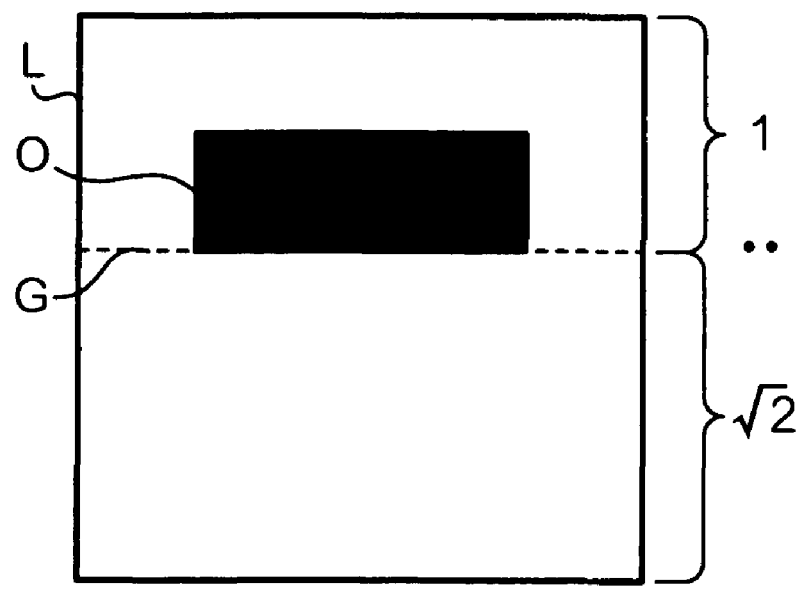

(2) Example of Selecting a Split Ratio Depending on the Color of a Target Object FIGS. 16A and 16B exemplarily show another method for selecting a split ratio according to Modification 2. In this example, the HDD 150 stores two split ratios of $r_1=\sqrt{2}$ and $r_2=1.618$. The HDD 150 also stores a table which holds correspondence between object attributes and split ratios. This table describes that: if the color of an object is a warm color such as red, orange, or yellow, the split ratio $r_2$ is used (FIG. 16A); and if the color of an object is a cold color such as green, blue, or purple, the split ratio $r_1$ is used (FIG. 16B). The CPU 110 selects a split ratio in accordance with this table. In FIGS. 16A and 16B, colors are expressed by hatching in place of painting actual colors.

If the color of the object O is a warm color, the object is more visually attractive, i.e., the object is conspicuous. Therefore, the golden ratio is adopted as a split ratio. Inversely, a cold color is less visually attractive, and therefore, a ratio other than the golden ratio is adopted.

3-3. Modification 3

In a case where the HDD 150 stores plural split ratios, a split ratio may be selected based on layout. In this case, the HDD 150 stores a table which holds correspondence between layouts and split ratios. This case will now be described with reference to specific examples below. In the examples described below, the HDD 150 stores two split ratios $r_1=\sqrt{2}$ and $r_2=1.618$.

Example of Selecting a Split Ratio Depending on the Number of Objects

In this example, the HDD 150 stores a table which holds correspondence between numbers of objects included in a document and split ratios. This table describes that: if the number of objects is equal to or greater than a threshold (e.g., five), the split ratio $r_1$ is used; and if the number of objects is smaller than the threshold, the split ratio $r_2$ is used. The CPU 110 selects a split ratio in accordance with this table.

(2) Example of Selecting a Split Ratio Depending on Layout of Objects

In this example, a document $D_1$ includes layout information indicative of coarse locations of objects. The layout information includes information indicative of coarse locations of objects within a layout area, e.g., "an object $T_1$ is located in an area of ⅓ from the top of the layout area, and an object $I_1$ is located in the lower half of the layout area". The HDD 150 further stores a table which holds correspondence between layouts of objects and split ratios. This table describes that: if an object is located in the upper half of the layout area, the split ratio $r_1$ is used; and if an object is located in the lower half of the layout area, the split ratio $r_2$ is used. The CPU 110 selects a split ratio in accordance with this table.

3-4. Modification 4

In a case where the HDD 150 stores plural split ratios, a split ratio may be selected based on a background. In this case, the document $D_1$ includes background information. The background information indicates a background of the document. The HDD 150 stores a table which holds correspondence between backgrounds and split ratios. This case will now be described with reference to specific examples below. In the examples described below, the HDD 150 stores two split ratios $r_1=\sqrt{2}$ and $r_2=1.618$.

Figure 17A:
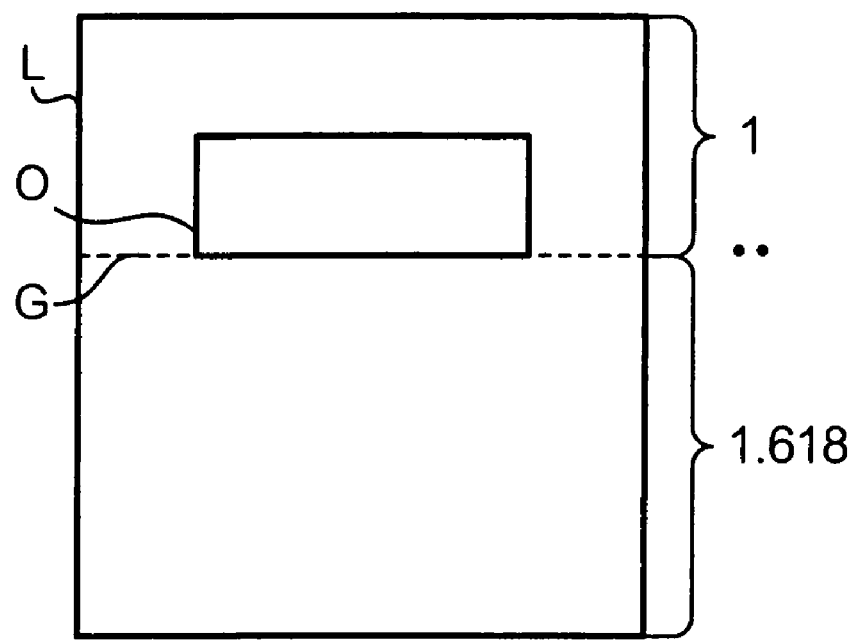
FIGS. 17A and 17B exemplarily show a method for selecting a split ratio according to Modification 4.
Figure 17B:
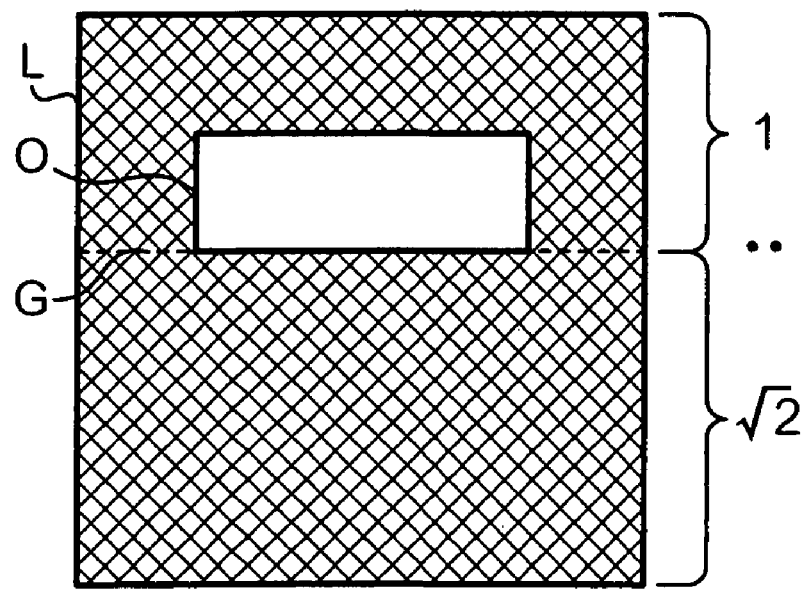

Example of Selecting a Split Ratio Depending on a Frequency Component of the Background FIGS. 17A and 17B exemplarily show a method of selecting a split ratio according to Modification 4. In this example, the CPU 110 obtains a frequency characteristic of a background image. The CPU 110 further obtains a characteristic frequency of the background, from the obtained frequency characteristic. The characteristic frequency is a frequency indicative of a characteristic of a frequency, i.e., a boundary value of frequency at which intensity becomes equal to or greater than a threshold. The HDD 150 stores a table which holds correspondence between characteristic frequencies and split ratios. This table describes that: if the characteristic frequency is within a high-frequency range lower than a threshold, the split ratio $r_1$ is used (FIG. 17A); and if the characteristic frequency is within a high-frequency range higher than the threshold, the split ratio $r_2$ is used (FIG. 17B). The CPU 110 selects a split ratio in accordance with this table.

If the characteristic frequency is within a low-frequency range, e.g., if low-frequency components are dominant in the background, the background is a plain image or a roughly patterned image (if the image is patterned). In this case, locations of objects can be visually sensitively recognized, and therefore, the golden ratio is used as a split ratio. Inversely, if the characteristic frequency is within a high-frequency range, e.g., if high-frequency components are dominant in the background, the background is a complicated patterned image. In the latter case, locations of objects cannot be visually recognized, and therefore, a ratio other than the golden ratio is used as a split ratio.

Figure 18A:
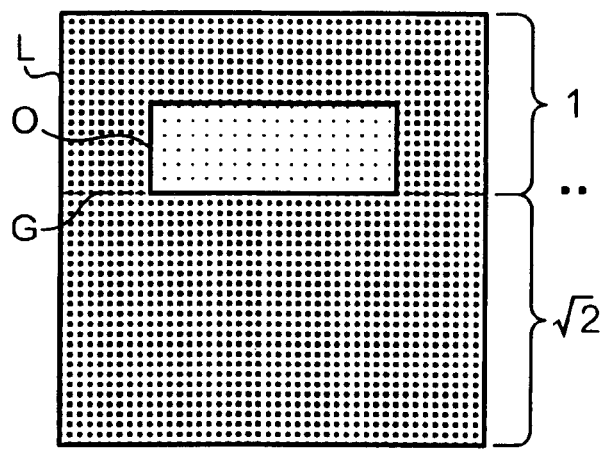
FIGS. 18A and 18B exemplarily show another method for selecting a split ratio according to Modification 4.
Figure 18B:
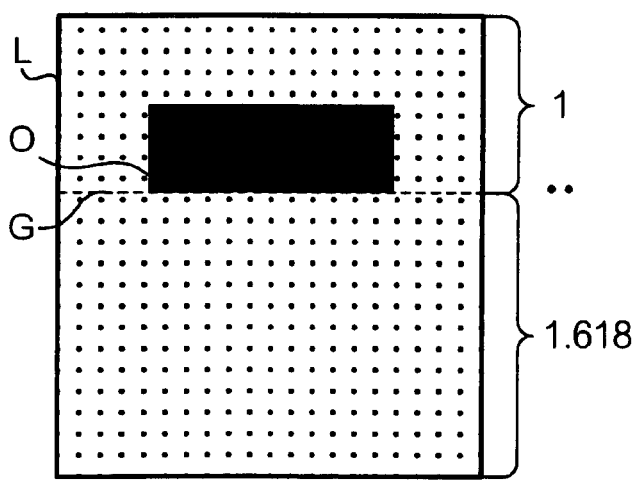

(2) Example of Selecting a Split Ratio Depending on Color Contrast Between the Background and an Object FIGS. 18A and 18B exemplarily show another method of selecting a split ratio according to Modification 4. In this example, the CPU 110 calculates a contrast between the color of a target object and a background color. The HDD 150 stores a table which holds correspondence between contrasts and split ratios. This table describes that: if the contrast is lower than a threshold, the split ratio $r_1$ is used (FIG. 18A); and if the contrast is higher than the threshold, the split ratio $r_2$ is used (FIG. 18B). The CPU 110 selects a split ratio in accordance with this table. In FIGS. 18A and 18B, colors are expressed by hatching in place of filling with actual colors.

If the contrast is high, locations of objects can be visually sensitively recognized, and therefore, the golden ratio is used as a split ratio. Inversely, if the contrast is low, locations of objects cannot sensitively be recognized, and a split ratio other than the golden ratio is used.

In Modifications 2 to 4, $r_1=\sqrt{2}$, $r_2=1.618$, and $r_3=2.0$ are used as examples of plural split ratios. Split ratios are not limited to these values. Any other split ratios may be used in so far as the split ratios are such ratios as are described in Modification 1. Since the relationships between split ratios and attributes as described in Modifications 2 to 4 are mere examples, relationships between split ratios and attributes are not limited to those described in Modifications 2 to 4. For example, in Modification 4, a different split ratio from the golden ratio may be used when the contrast is high. On the other side, the golden ratio may be used when the contrast is low.

3-5. Modification 5

Two reference lines used for generating grid lines need not always be parallel to each other. Even if reference lines are not mutually parallel, the CPU 110 may generate grid lines which split the interval between the two reference lines, at the golden ratio.

Figure 19:
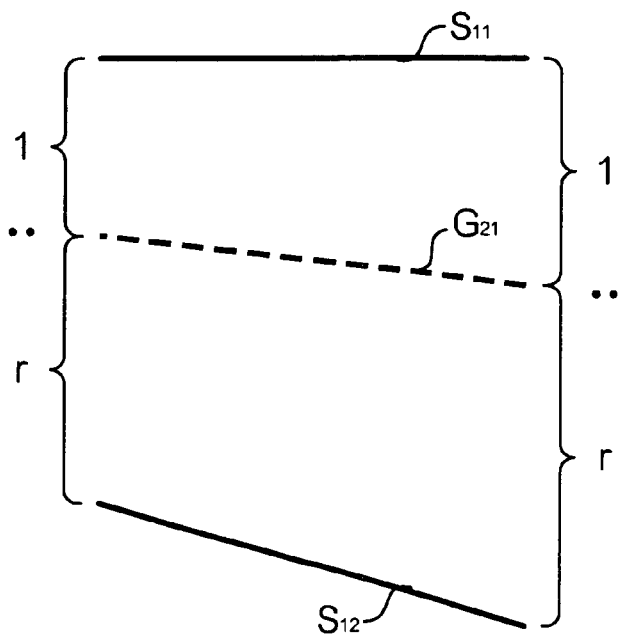
FIG. 19 exemplarily shows a case of reference lines which are not parallel to each other.
Figure 20:
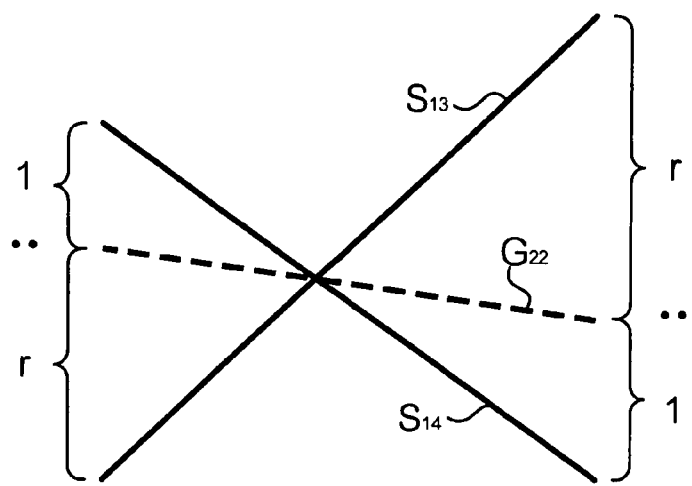
FIG. 20 exemplarily shows another case of reference lines which are not parallel to each other.
Figure 21:
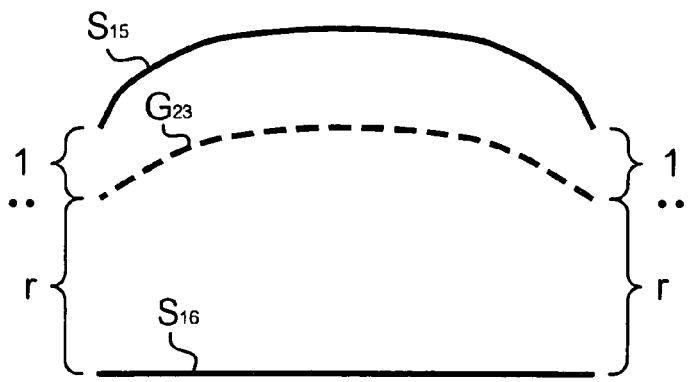
FIG. 21 exemplarily shows still another case of reference lines which are not parallel to each other.

FIGS. 19, 20, and 21 exemplarily show cases where reference lines are not parallel to each other. FIG. 19 shows an example in which reference lines are not parallel and do not cross each other in a layout area. A grid line $G_{21}$ splits the interval between reference lines $S_{11}$ and $S_{12}$ at a predetermined split ratio r. FIG. 20 shows an example in which reference lines are not parallel but cross each other in a layout area. A grid line $G_{22}$ splits the interval between reference lines $S_{13}$ and $S_{14}$ at a predetermined split ratio r. FIG. 21 shows an example in which one of reference lines is a curve. A grid line $G_{23}$ splits the interval between reference lines $S_{15}$ and $S_{16}$ at a predetermined split ratio r. As can be understood from these examples, two reference lines need not always be parallel to each other and may be curved.

3-6. Modification 6

A figure which is used for setting reference lines on the basis of an object is not limited to a circumscribed rectangle. The figure may be a circumscribed triangle or pentagon or any other circumscribed polygon. What circumscribed polygon is used as the figures is determined in advance. Alternatively, an object may be given, as attribute information, information indicating what circumscribed polygon should be used. Also alternatively, what circumscribed polygon should be used may be determined depending on the shape of a layout area.

A circumscribed polygon of an object need not always visually touch externally the object. Since each object has its own area as data, whatever polygon is available as a circumscribed polygon as far as the polygon circumscribes the area. For example, if a blank space as data is given in the periphery of an image also as data, a circumscribed polygon externally touches an area including the blank space.

3-7. Modification 7

Lines used as reference lines and the order of using the lines are not limited to those described in the embodiment. That is, in the example shown in FIG. 5, the boundary of the layout area L is determined first as a reference line (step S100). Subsequently, at least one reference line is extracted from another object (step S120). However, processing for selecting reference lines is not limited to these steps. For example, the HDD 150 may store a table which describes conditions for selecting reference lines. In this case, the CPU 110 selects reference lines in accordance with this table. Any condition may be used to select reference lines. For example, different conditions may be used depending on a number of times the processing for generating a grid line is looped. More specifically, a boundary of a layout area is selected as reference line candidates in the first loop. In the second loop, the boundary of the layout area and edges of a circumscribed rectangle of another object are selected as reference line candidates. In the third loop, the boundary of the layout area, edges of the circumscribed rectangle of the other object, and grid lines which have already been generated are used as reference line candidates.

3-8. Modification 8

Since grid lines are virtual lines, the grid lines need not always be displayed so as to allow users to visually check grid lines. However, the CPU 110 may display a symbolic figure corresponding to a grid line on the display 170. The above embodiment has been described with reference to an example in which a line (line segment) is displayed as a symbolic figure corresponding to a grid line, with the line overlapped on a grid line. However, the symbolic figure displayed overlapping a grid line is not limited to a line. A line segment, broken line, dot, or any other symbolic figure may be displayed. Such symbolic figures may be located at predetermined intervals, overlapped on a grid line.

3-9. Modification 9

The method for obtaining an object in the step S10 (FIG. 3) is not limited to the method described in the above embodiment. An object may be obtained separately from other data included in a target document. If plural objects exist, the objects may be obtained separately from each other. Further, the objects need not always include attribute information. Attribute information may be obtained and processed as separate data from the objects.

3-10. Modification 10

Timing for storing correspondence information of reference lines and correspondence information concerning snapping are not limited to the timing as described in the above embodiment. The CPU 110 may store correspondence information of reference lines into the HDD 150 each time a grid line is generated. Alternatively, the CPU 110 may store correspondence information of reference lines into the HDD 150 after processing for determining a location is complete for all objects included in a target document. Further, the CPU 110 may store correspondence information concerning snapping into the HDD 150 each time a location of an object is determined. Alternatively, the CPU 110 may store correspondence information concerning snapping into the HDD 150 after processing for determining a location is complete for all objects included in the target document. Also alternatively, the CPU 110 need not store correspondence information in the HDD 150.

3-11. Modification 11

The event which triggers processing for updating grid lines is not limited to the trigger as described in the flow shown in FIG. 11. In the flow shown in FIG. 11, update of grid lines is carried out triggered by a change made to a size of an object. However, update of grid lines may be triggered by an instruction from a user, such as a click on an update button.

3-12. Modification 12

The processing for locating an object along a grid line in the step S30 (FIG. 3) is not limited to processing which arranges an object so as to touch a grid line. Phrasing of locating an object "along" is intended to mean location which allows a relative positional relationship between a characteristic point of an object and a grid line to satisfy a predetermined relationship, wherein the characteristic point of an object is determined based on at least one position of the object. The characteristic point may be a predetermined point among vertices of a circumscribed polygon (e.g., a left upper vertex of a circumscribed rectangle), a predetermined point on an edge of a circumscribed polygon (e.g., a middle point on the upper edge of a circumscribed rectangle), a center, a gravity center, or any other point.

3-13. Modification 13

The above embodiment has been described with reference to an example in which objects each have a rectangular shape. However, shapes of objects are not limited to rectangles. Each object may have any shape, such as an ellipse, n-gon (n is a natural number that satisfies n≧3), or a combination thereof in so far as the object has a definite shape.

Figure 22A:
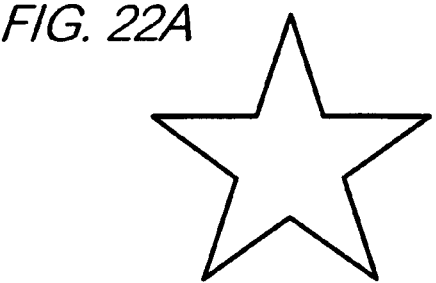
FIGS. 22A, 22B, and 22C exemplarily shows reference lines for an object having a star-like shape.
Figure 22B:
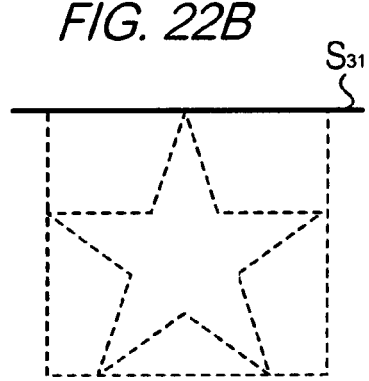
Figure 22C:
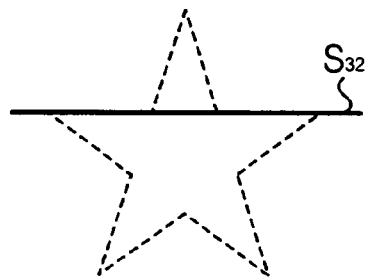

FIGS. 22A through 22C exemplarily show reference lines for a star-like object. FIG. 22A shows the shape of the object. FIG. 22B shows an example of using as a reference line an edge (precisely, extension $S_{31}$ of the edge) of a circumscribed rectangle of the object. FIG. 22C shows an example of using as a reference line an edge (precisely, extension $S_{32}$ of the edge) of the object.

3-14. Modification 14

The above embodiment has been described with reference to an example in which lines determined on the basis of a layout area or an object are used as reference lines. However, lines available as reference lines are not limited only to such lines. A grid line which has already been generated may be used as a reference line for generating a new grid line.

3-15. Modification 15

The number of objects is not limited to the number described in the above embodiment. The above embodiment has been described with reference to an example in which one object is given as a target whose location is to be determined and another object is also given. However, plural objects may be targets whose locations are to be determined. In this case, the CPU 110 specifies objects as targets to be actually processed, one after another from among the plural objects. The CPU 110 subjects the objects specified as the targets to be processed to the processing described in the above embodiment. At this time, an object other than the object which is now a target to be actually processed, among the plural objects as targets whose locations have not yet been determined, may be dealt with by the CPU 10 as the object other than the object used for generating a grid line, or may be excluded from consideration by the CPU 10 when generating a grid line.

3-16. Modification 16

The functional structure of the document editing device is not limited to the structure shown in FIG. 1. Functions shown in FIG. 1 may be partially omitted. In particular, functions related to update of grid lines (the editing unit 106 and update unit 107) may be omitted. The hardware structure of the document editing device is not limited to the structure shown in FIG. 2. The hardware components shown in FIG. 2 may be partially omitted. In particular, the keyboard/mouse 160, display 170, and network IF 180 may be omitted. These functions may be provided by a device other than the document editing device. Alternatively, a system including plural devices may have the functional structure shown in FIG. 1 and the hardware structure shown in FIG. 2. For example, one of the plural devices may have a function equivalent to the grid line generation unit 102 of the object obtaining unit 101 in FIG. 1, and another one of the plural devices may have the other functions. The system including such devices may have, as a whole, the functional structure shown in FIG. 1.

3-17. Modification 17

In the flow shown in FIG. 5, the processing of the steps S110 to S150 may be omitted. That is, grid lines may be generated only on the basis of the boundary of the layout area. Inversely, the processing of the step S100 may be omitted from the flow of FIG. 5. In brief, in what order and from what figures reference lines are extracted may be designed in whatever manner in so far as two reference lines are used which are extracted from at least one of three items: an object other than the target object among objects included in a target document; a boundary of a layout area L; and grid lines which have already been generated.

3-18. Modification 18

From the flow shown in FIG. 7, the processing of the step S123 may be omitted. That is, grid lines may be generated for all target areas, regardless of a size of a target area.

3-19. Other Modifications

In the embodiment and modifications described above, the data, information, parameters, and the like stored in the HDD 150 may be stored in a device other than the HDD 150. For example, attribute information may be stored in a device other than the document editing device 100. In this case, the document editing device 100 obtains attribute information from the other device by communication through a network or direct connection. Also in this case, the document editing device 100 need not store attribute information in advance. Alternatively, data, information, parameters, and the like may be input by a user.

Also in the embodiment and modifications described above, "predetermined" data, information, parameters, and the like may be determined in accordance with an instruction from a user. Alternatively, such data, information, parameters, and the like may be determined by the CPU 110 in accordance with a predetermined algorithm.

Also in the embodiment and modifications described above, the document editing program is stored in the HDD 150. However, the document editing device may be provided by a storage medium readable from computers, such as a CD-ROM (Compact Disk Read Only Memory).

What is claimed is:

1. A document editing support device comprising:
a processor; and
a memory operably connected to the processor and configured to store a predetermined split ratio, wherein
the processor is configured to obtain at least one object as data representing at least one of a text and an image included in a document as a target to be edited;
the processor is further configured to extract two lines from at least one of a circumscribed polygon and a boundary and to set the extracted lines as reference lines, the circumscribed polygon being of an object other than a target object, a location of which is to be determined relative to at least one obtained object, and the boundary being of a layout area where objects are to be located in the document;
the processor is configured to generate a virtual line that splits an interval between the two reference lines set at a split ratio stored in the memory; and the processor is further configured to determine a location of the target object, the location of which is to be determined, along the generated virtual line within the layout area.

2. The document editing support device according to claim 1, wherein the split ratio is within a range of $$\sqrt{2} \le r \le 2 \text{ or } \frac{1}{2} \le r \le \frac{1}{\sqrt{2}}$$

where r is the split ratio.

3. The document editing support device according to claim 2, wherein the split ratio is within a range of $$\left(0.9 \times \frac{1+\sqrt{5}}{2}\right) \le r \le \left(1.1 \times \frac{1+\sqrt{5}}{2}\right) \text{ or } \left(0.9 \times \frac{2}{1+\sqrt{5}}\right) \le r \le \left(1.1 \times \frac{2}{1+\sqrt{5}}\right).$$

4. The document editing support device according to claim 3, wherein the split ratio is $$r = \frac{1+\sqrt{5}}{2} \text{ or } r = \frac{2}{1+\sqrt{5}}.$$

5. The document editing support device according to claim 1, wherein at least one of the two reference lines is extracted from a circumscribed rectangle of the object other than the target object.

6. The document editing support device according to claim 1, wherein the processor is configured to extract the two lines from at least one of the circumscribed polygon of the object other than the target object, the boundary of the layout area, and virtual lines which have already been generated, and is configured to set the extracted lines as the reference lines.

7. The document editing support device according to claim 1, wherein
the memory is further configured to store information indicative of correspondence between an object and a virtual line that is generated using as a reference line a line extracted from a circumscribed polygon of the object.

8. The document editing support device according to claim 1, wherein
the processor is further configured to change a size or position of an object included in the document, to edit the object; and
the processor is further configured to update a virtual line by use of a reference line, after an object is edited by the processor, the virtual line being defined as corresponding to the object by the information stored in the memory, and the reference line being extracted from a circumscribed polygon of the edited object.

9. The document editing support device according to claim 8, wherein
the memory is further configured to store information indicative of correspondence between the generated virtual line and an object located along the virtual line, and after the virtual line is updated, an object that is defined as having been located along the virtual line according to the information stored in the memory is relocated along the updated virtual line.

10. The document editing support device according to claim 1, wherein
the memory is further configured to store information indicative of correspondence between the boundary of the layout area and a virtual line which is generated using as a reference line a line extracted from the boundary.

11. The document editing support device according to claim 10, wherein
the processor is further configured to change a size or position of the layout area in the document, to edit the layout area; and
the processor is further configured to update a virtual line by use of a reference line, after the layout area is edited, the virtual line being defined as corresponding to the layout area by the information stored in the memory, and the reference line being extracted from the boundary of the edited layout area.

12. The document editing support device according to claim 1, wherein
the memory is configured to store a plurality of split ratios,
the target object, the location of which is to be determined, includes attribute information indicating an attribute of the object,
the processor is further configured to select one split ratio from the plurality of split ratios stored in the memory, on the basis of the attribute information included in the target object, the location of which is to be determined, and
the processor is further configured to generate a virtual line which splits the interval between the two reference lines set, at the selected split ratio.

13. The document editing support device according to claim 1, wherein
the memory is configured to store a plurality of split ratios,
the document includes layout information indicative of a location of the at least one object included in the document,
the processor is further configured to select one split ratio from the plurality of split ratios stored in the memory on the basis of the layout information included in the document, and
the processor is further configured to generate a virtual line which splits the interval between the two reference lines set at the selected split ratio.

14. The document editing support device according to claim 1, wherein
the memory is configured to store a plurality of split ratios,
the document includes background information indicative of a background,
the processor is further configured to select one split ratio from the plurality of split ratios stored in the memory on the basis of the background information included in the document, and
the memory is further configured to generate a virtual line which splits the interval between the two reference lines set at the selected split ratio.

15. The document editing support device according to claim 1, further comprising a display controller that causes a display to show a symbolic figure overlapped on the virtual line.

16. The document editing support device according to claim 1, wherein
the obtained at least one object includes a first object and a second object,
the target object is the second object, the two reference lines set includes a first reference line and a second reference line, the first reference line includes a side of the circumscribed polygon of the first object, the second reference line includes a line included in the document, which is different from the first reference line, and the second reference line is outside the first object.

17. The document edit support device according to claim 16, wherein the first reference line and the second reference line do not intersect in the layout area.

18. The document edit support device according to claim 16, wherein if a distance between the first reference line and the second reference line is less than a threshold, the processor is configured not to generate a virtual line between the first reference line and the second reference line.

19. The document edit support device according to claim 16, wherein if a width of an area defined by the first reference line and the second reference line is less than a threshold, the processor is configured not to generate a virtual line between the first reference line and the second reference line.

20. The document edit support device according to claim 16, wherein after the virtual line is generated, the processor is configured to generate another virtual line by using another side of the circumscribed polygon of the first object as the first reference line.

21. A computer readable storage medium storing a program for causing a computer device having a processor and a memory that stores a predetermined split ratio to execute a process, the process comprising:

obtaining, by the processor, at least one object as data representing at least one of a text and an image included in a document as a target to be edited;

extracting, by the processor, two lines from at least one of a circumscribed polygon and a boundary, and setting the extracted lines as reference lines, the circumscribed polygon being of an object other than the target object, the location of which is to be determined relative to the obtained at least one object, and the boundary being of a layout area where objects are to be located in the document;

generating, by the processor, a virtual line which splits an interval between the two reference lines, at a split ratio stored in the memory; and determining, by the processor, a location of the target object, the location of which is to be determined, along the generated virtual line, within the layout area.

* * * * *